(12) United States Patent
Orlando

(10) Patent No.: US 7,742,596 B2
(45) Date of Patent: Jun. 22, 2010

(54) RELIABLE ELLIPTIC CURVE CRYPTOGRAPHY COMPUTATION

(75) Inventor: Gerardo Orlando, Newton, MA (US)

(73) Assignee: General Dynamics C4 Systems, Inc., Scottsdale, AZ (US)

( * ) Notice: Subject to any disclaimer, the term of this patent is extended or adjusted under 35 U.S.C. 154(b) by 1401 days.

(21) Appl. No.: 11/158,635

(22) Filed: Jun. 21, 2005

(65) Prior Publication Data

US 2006/0045262 A1 Mar. 2, 2006

Related U.S. Application Data

(60) Provisional application No. 60/604,079, filed on Aug. 24, 2004.

(51) Int. Cl.
H04L 9/00 (2006.01)
(52) U.S. Cl. ............................................ 380/28
(58) Field of Classification Search ............... None
See application file for complete search history.

(56) References Cited

U.S. PATENT DOCUMENTS

| | | | |
|---|---|---|---|
| 5,854,759 | A | 12/1998 | Kaliski et al. |
| 6,252,959 | B1 | 6/2001 | Paar et al. |
| 6,430,588 | B1 * | 8/2002 | Kobayashi et al. .......... 708/492 |
| 6,618,483 | B1 | 9/2003 | Vanstone et al. |
| 6,826,586 | B2 | 11/2004 | Chang |
| 7,076,061 | B1 * | 7/2006 | Lenstra et al. ................ 380/44 |
| 7,177,422 | B2 * | 2/2007 | Akishita .................... 380/28 |
| 2003/0081785 | A1 | 5/2003 | Boneh et al. |
| 2003/0208518 | A1 | 11/2003 | Gura et al. |
| 2004/0114760 | A1 * | 6/2004 | Brown et al. ................ 380/255 |
| 2004/0247115 | A1 * | 12/2004 | Ono et al. .................... 380/28 |

(Continued)

OTHER PUBLICATIONS

PCT International Search Report PCT/US05/30177, Sep. 29, 2006.

(Continued)

*Primary Examiner*—Matthew B Smithers
*Assistant Examiner*—Jeffery Williams
(74) *Attorney, Agent, or Firm*—Ingrassia Fisher & Lorenz, P.C.

(57) ABSTRACT

A method for reliable computation of point additions and point multiplications in an elliptic curve cryptography (ECC) system. Two asymmetric operations are performed: one of the operations is of slightly higher complexity than a conventional ECC operation, and the other operation is of much lower complexity than the first operation. The complexity of the second operation is a function of the desired degree of reliability, or the desired probability of failure detection. The method validates a computation involving one or more points on a specified elliptic curve by selecting a second elliptic curve, deriving a third elliptic curve from the specified and selected curves, projecting points onto the derived curve, performing a computation on the derived curve involving the projected points, validating the computation on the selected curve, extracting from the computation on the derived curve a predicted result of the computation on the selected curve, and comparing the predicted result to the computation on the selected curve. A predicted result of the computation to be validated may then be extracted from the computation on the derived curve. The predicted result is compared to an actual result of a computation on the selected curve, and if the results match, the predicted result of the computation performed on the selected curve is validated.

20 Claims, 12 Drawing Sheets

U.S. PATENT DOCUMENTS

2006/0029221 A1* 2/2006 Ibrahim ................ 380/28
2006/0210068 A1* 9/2006 Lauter et al. ........... 380/28
2009/0113252 A1* 4/2009 Lambert et al. ......... 714/48

OTHER PUBLICATIONS

U.S. Dept. of Commerce/NIST, Federal Information Processing Standards Publication 186-2, "Digital Signature Standard," Jan. 2000.

A.J. Menezes et al., "Handbook of Applied Cryptography," CRC Press, Inc. 1997; Chapters 1, 10, and pp. 68, 612-613.

G. Orlando, "Efficient Elliptic Curve Processor Architectures for Field Programmable Logic," Ph.D. dissertation, ECE Dept., Worcester Polytechnic Institute, Worcester, MA, Mar. 2002.

N. Demytko, "A New Elliptic Curve Based Analogue of RSA," Advances in Cryptology—Eurocrypt '93 (LNCS 765), pp. 40-49, Springer-Verlag, 1994.

E. Brier et al., "Weierstrass Elliptic Curves and Side Channel Attacks," Public Key Cryptography (LNCS 2274), pp. 335-345, Springer-Verlag, 2002.

N. Koblitz "Elliptic Curve Cryptosystems," Mathematics of Computation, vol. 48, No. 177, Jan. 1987, pp. 203-209.

* cited by examiner

Fig. 8A

| Case | Description | Case avoided if | Input at top of loop | Input adj | Input $k_i$ | Steps 2.1.1-2.1.3 $k'_i$ | Steps 2.1.1-2.1.3 $k''_i$ | Step 2.1.4 | Condition step 2.1.5 $\|k_{rq} + k'_i\|_{nq} = 0?$ |
|---|---|---|---|---|---|---|---|---|---|
| 0 | Typical. No adj. | | $k_{rq}$ | 0 | $\geq 0$ | $k'_i$ | $k''_i$ | $k_{rq} = \|2^w k_{rq}\|_{nq}$ | no |
| 1 | Multiple of $n_q$ encountered. Adj. propagated | | $\|2^{-w}(n_q-k_j)\|_{nq}$ | 0 | $>0$ | $k_i$ | 0 | $\|2^w k_{rq}\|_{nq}$ | yes |
| 2 | Double encountered. Adj. propagated | | $\|2^{-w} k_j\|_{nq} = 2^{-w}$ | 0 | $=1$ | $k_i$ | 0 | $n_q - k_i$ | no |
| 3 | Double encountered and resolved | | $\|2^{-w} k_j\|_{nq}$ | 0 | $>1$ | $k_i$ | 0 | 1 | no |
| 4 | Previous multiple of $n_q$. Adj. propagated | | $n_q - 1$ | 1 | $=0$ | $k_i = 1$ | $k_i = 0$ | $k_i$ | yes |
| 5 | Previous multiple of $n_q$. Adj. resolved | | $n_q - 1$ | 1 | $>0$ | $2^w$ | $k_i$ | $n_q - 2^w$ | yes |
| 6 | Previous double. Adj. resolved | | $\|2k_{i-1}-1\|_{nq}, k_{i-1}=1$ | 1 | $\geq 0$ | $2^w$ | $k_i$ | $n_q - 2^w$ | no |
| 7 | Previous double. adj. resolved. Multiple of $n_q$ encountered. Adj. propagated | $n_q > 3*2^w - 1$ | $\|2k_{i-1}-1\|_{nq}, k_{i-1}=1$ | 1 | $\geq 0$ | $2^w$ | $k_i$ | $2^w$ | no |
| 8 | Previous double. Adj. resolved | | $\|2k_{i-1}-1\|_{nq}, k_{i-1}>1$ | 1 | $\geq 0$ | $2^w$ | $k_i$ | $2^w$ | no |
| 9 | Previous double. adj. resolved. Multiple of $n_q$ encountered. Adj. propagated | $n_q > (2^w+1)(2^w-1)$ | $\|2k_{i-1}-1\|_{nq}, k_{i-1}>1$ | 1 | $>0$ | $2^w$ | $k_i$ | $\|2^w(2k_{i-1}-1)\|_{nq}$ | no |
| 10 | Previous double. adj. resolved. New double encountered. Adj. propagated | $n_q > 2^{w+1}(2^w-1)$ | $\|2k_{i-1}-1\|_{nq}, k_{i-1}>1$ | 1 | $>0$ | $2^w$ | $k_i$ | $\|2^w(2k_{i-1}-1)\|_{nq}$ | no |

Legend: $\|x\|_{nq}$ represents $x \bmod n_q$.

Fig. 8B

| Case | Condition step 2.1.5 | Result after 2.1.5 | Result after 2.1.5 | Step 2.1.6 | Condition step 2.1.7 | Condition step 2.1.7 | Result after 2.1.7 | Result after 2.1.7 | Step 2.1.8 |
|---|---|---|---|---|---|---|---|---|---|
| | $k_{rq} = k'_i$? | $k'_i$ | $k''_i$ | $k_{rq} = \lvert k_{rq}+k'_i\rvert_{nq}$ | $\lvert k_{rq}+k'_i\rvert_{nq} = 0$? | $k_{rq} = k''_i$? | $k''_i$ | adj | $k_{rq} = \lvert k_{rq}+k''_i\rvert_{nq}$ |
| 0 | | | | $\lvert 2^w k_{rq}+k'_i\rvert_{nq}$ | | | | | $\lvert 2^w k_{rq}+k''_i\rvert_{nq}$ |
| 1 | no | $k_i$ | 0 | $n_q-1$ | no | no | 0 | 0 | $n_q-1$ |
| 2 | yes | $k_i-1$ | 1 | 1 | yes | no | 0 | 1 | 1 |
| 3 | yes | 0 | 1 | $2k_i-1$ | no | yes | 0 | 1 | $2k_i$ |
| 4 | no | $k_i-1$ | 1 | $n_q-1$ | yes | no | 1 | 0 | $n_q-1$ |
| 5 | no | $2^w-1$ | $k_i+1$ | $2^{w+1}-1$ | no | no | 0 | 1 | $k_i$ |
| 6 | yes | $2^w-1$ | $k_i+1$ | $2^{w+1}-1$ | yes | no | $k_i+1$ | 0 | $\lvert 2^{w+1}+k_i\rvert_{nq}$ |
| 7 | yes | $2^w-1$ | $k_i+1$ | $2^{w+1}-1$ | no | no | $k_i+1$ | 0 | $n_q-1$ |
| 8 | no | $2^w$ | $k_i$ | $\lvert 2^{w+1}k_{i-1}\rvert_{nq}$ | yes | no | $k_i$ | 1 | $\lvert 2^{w+1}k_{i-1}+k_i\rvert_{nq}$ |
| 9 | no | $2^w$ | $k_i$ | $\lvert 2^{w+1}k_{i-1}\rvert_{nq}$ | yes | no | $k_i-1$ | 0 | $n_q-1$ |
| 10 | no | $2^w$ | $k_i$ | $\lvert 2^{w+1}k_{i-1}\rvert_{nq}$ | no | yes | $k_i-1$ | 1 | $2k_i-1$ |

Legend: $\lvert x\rvert_{nq}$ represents $x \bmod n_q$.

| j | Input at top of loop $k_{rq}$ | Input adj | Input $k_i$ | Steps 2.1.1 - 2.1.3 $k'_i$ | Steps 2.1.1 - 2.1.3 $k''_i$ | Step 2.1.4 $k_{rq}=\|2^w k_{rq}\|_{nq}$ | Condition step 2.1.5 $\|k_{rq}+k'_i\|_{nq}=0$? | Condition step 2.1.5 $k_{rq}=k'_i$? |
|---|---|---|---|---|---|---|---|---|
| 0 | 0 | 0 | 1 | 1 | 0 | 0 | no | no |
| 1 | 1 | 0 | 1 | 1 | 0 | 2 | no | no |
| 2 | 3 | 0 | 1 | 2 | 0 | 1 | no | yes |
| 3 | 1 | 1 | 1 | 2 | 1 | 2 | no | yes |
| 4 | 4 | 1 | 0 | 2 | 0 | 3 | yes | no |

| j | Result after 2.1.5 $k'_i$ | Result after 2.1.5 $k''_i$ | Step 2.1.6 $k_{rq}=\|k_{rq}+k'_i\|_{nq}$ | Condition step 2.1.7 $\|k_{rq}+k''_i\|_{nq}=0$? | Condition step 2.1.7 $k_{rq}=k''_i$? | Result after 2.1.7 $k''_i$ | Result after 2.1.7 adj | Step 2.1.8 $k_{rq}=\|k_{rq}+k''_i\|_{nq}$ |
|---|---|---|---|---|---|---|---|---|
| 0 | 1 | 0 | 1 | no | no | 0 | 0 | 1 |
| 1 | 1 | 0 | 3 | no | no | 0 | 0 | 3 |
| 2 | 0 | 1 | 1 | no | yes | 1 | 1 | 1 |
| 3 | 1 | 2 | 3 | yes | no | 0 | 1 | 4 |
| 4 | 1 | 1 | 4 | yes | no | 0 | 1 | 4 |

Legend: $|x|_{nq}$ represents $x \bmod n_q$.

Fig. 9

| w | $n_q$ | Pr(m) | Pr(e) | Error |
|---|---|---|---|---|
| 1 | 37 | 72.1% | 73.7% | -2.2% |
| | 61 | 81.4% | 83.2% | -2.2% |
| | 127 | 92.2% | 92.4% | -0.2% |
| 2 | 37 | 78.2% | 77.9% | 0.4% |
| | 61 | 86.7% | 86.1% | 0.7% |
| | 127 | 94.2% | 94.2% | 0% |
| 4 | 37 | 85.7% | 85.5% | 0.2% |
| | 61 | 91.3% | 91.1% | 0.2% |
| | 127 | 95.9% | 95.6% | 0.3% |

Legend:
Pr(m) - Measured Probability
Pr(e) - Estimated Probability
Error - Approximation error: Error = (Pr(m) - Pr(e))/Pr(m)

Fig. 10

| $w$ | $n_q$ | Pr(m) | Pr(e) | Error |
|---|---|---|---|---|
| 1 | 37 | 0.44% | 0.55% | -25.0% |
| | 61 | 3.7% | 4.4% | -18.9% |
| | 127 | 21.5% | 22.8% | -6.0% |
| | $2^{16}-15$ | 99.74% | 99.73% | 0.01% |
| | $2^{32}-5$ | 100% | 99.99999627% | $37 \times 10^{-7}$% |
| 2 | 37 | 1.8% | 2.0% | -11.1% |
| | 61 | 8.6% | 9.5% | -10.5% |
| | 127 | 32.2% | 33.0% | -2.5% |
| | $2^{16}-15$ | 99.84% | 99.80% | 0.04% |
| | $2^{32}-5$ | 100% | 99.99999721% | $28 \times 10^{-7}$% |
| 4 | 37 | 8.1% | 8.6% | -6.2% |
| | 61 | 22.6% | 23.0% | -1.8% |
| | 127 | 49.5% | 49.7% | -0.4% |
| | $2^{16}-15$ | 99.87% | 99.88% | 0.01% |
| | $2^{32}-5$ | 100% | 99.99999825% | $18 \times 10^{-7}$% |

Legend:
Pr(m) - Measured Probability
Pr(e) - Estimated Probability
Error - Approximation error: Error = (Pr(m) - Pr(e))/Pr(m)

Fig. 11

RELIABLE ELLIPTIC CURVE CRYPTOGRAPHY COMPUTATION

This application claims the benefit of U.S. Provisional Application No. 60/604,079 filed Aug. 24, 2004.

BACKGROUND OF THE INVENTION

1. Field of the Invention

This invention relates generally to the field of elliptic curve cryptography, and more specifically, to elliptic curve point computation reliability.

2. Background

Cryptography systems based on elliptic curves are well known in the art. Elliptic curve cryptography (ECC) is widely used today as a method for encoding data to prevent unauthorized access to information that is stored or transmitted electronically. Increasingly, ECC systems are being used in data communications systems to ensure privacy, to authenticate transmissions, and to maintain data integrity.

Encryption in ECC systems involves finding a solution to the discrete logarithm problem from the group of points of an elliptic curve defined over a finite field. Using additive notation, this problem can be described as: given points P and Q in the group, find a number k such that kP=Q. Additional background on elliptic curves, and on mathematical operations performed on elliptic curves, is provided below.

Elliptic Curve Defined Over a Field

An elliptic curve $E_p$ over a field $F_p$, where p is a prime greater than three, is composed by the set of points (x,y) that satisfy an elliptic curve equation such as $y^2 \equiv x^3 + a_p x + b_p$ mod p together with the point at infinity $O_p$. The addition of points belonging to $E_p$ that involves the point at infinity are the following: $O_p + O_p = O_p$, $P + O_p = O_p + P = P$, $P + (-P) = (-P) + P = O_p$. Equation (1) defines an expression for the point addition operation $P_1 + P_2$ for which $P_1 \neq O_p$, $P_2 \neq O_p$, and $P_1 + P_2 \neq O_p$.

$$\lambda_p \equiv (y_2 - y_1)/(x_2 - x_1) \bmod p \text{ for } P_1 \neq P_2$$

or $$(3x_1^2 + a_p)/(2y_1) \bmod p \text{ for } P_1 = P_2$$

$$x_3 \equiv \lambda_p^2 - x_1 - x_2 \bmod p$$

$$y_3 \equiv \lambda_p(x_1 - x_3) - y_1 \bmod p \qquad (1)$$

The points on $E_p$ define a commutative group under the point addition operation defined above. The number of points in the curve is denoted here by $\#E_p$. $\#E_p$ is also referred to as the order of the curve. The order of a point P is the scalar number $n_p$ for which $n_p P = O_p$. kP, where k is a scalar and P is a point on the curve, represents the addition of k points P (kP=P+P+ . . . +P). This operation, known as point multiplication, may be computed with iterated point additions.

Industry standards such as FIPS 186-2 ("Digital Signature Standard (DSS)," Federal Information Processing Standards Publication 186-2, U.S. Dept. of Commerce/NIST, January 2000), incorporated herein by reference, recommend the use of curves of prime orders in cryptography systems. In certain cases, subgroups of prime orders may also be used. For these curves and groups, the order of each point of interest with the exception of $O_p$ is the same. Using a group of prime order also guarantees that each point with the exception of $O_p$ is a generator of the group. Different multiples of a generator point define all the points in a group; for example, given that P is a generator, all the elements of the group correspond to the multiples iP where i=0 to $n_p - 1$, where $n_p$ represents the order of each point except $O_p$.

Elliptic Curve Defined Over a Ring

An elliptic curve $E_n$ over a ring $Z_n$ is composed by the set of points (x,y) that satisfy an elliptic curve equation such as $y^2 \equiv x^3 + a_n x + b_n$ mod n together with the point at infinity $O_n$.

The well-known Chinese Remainder Theorem (CRT) allows the representation of point $P=(x,y) \in E_n$ as follows: $P = [P_p, P_q] = [(x_p, y_p), (x_q, y_q)]$, where $P_p \in E_p$, $P_q \in E_q$, $x_p \equiv x$ mod p, $x_q \equiv x$ mod q, $y_p \equiv y$ mod p, and $y_q \equiv y$ mod q. $E_p$ and $E_q$ are elliptic curves defined over fields $F_p$ and $F_q$. $O_p$ and $O_q$ represent the points at infinity in $E_p$ and $E_q$, and by convention $O_n = [O_p, O_q]$. The constants in the curve expression for $E_n$ are related to the constants on the expressions for the curves $E_p$ and $E_q$ in the following way: $a_n = [a_p, a_q]$ and $b_n = [b_p, b_q]$, where $a_p \equiv a_n$ mod p, $a_q \equiv a_n$ mod q, $b_p \equiv b_n$ mod p, and $b_q \equiv b_n$ mod q. Throughout this disclosure, expressions inside brackets represent the projections modulo p and modulo q. The expression modulo n can be computed from the expressions modulo p and modulo q using Gauss's or Garner's algorithms. Descriptions of these algorithms are well known in the art, and can be found, e.g. in A. J. Menezes et al., "Handbook of Applied Cryptography," CRC Press, 1997 (hereinafter "Menezes"), available at www.cacr.math.uwaterloo.ca/hac, and incorporated herein by reference.

The addition of points belonging to $E_n$ can be defined so it is analogous to the addition of points belonging to curves defined over finite fields. The basic operations involving the point at infinity are the following: $O_n + O_n = O_n$, $P + O_n = O_n + P = P$, $P + (-P) = (-P) + P = O_n$. The addition $P_1 + P_2$, where $P_1 = [P_{1p}, P_{1q}]$ and $P_2 = [P_{2p}, P_{2q}]$, can be computed according to Equation (2) given the following restrictions in addition to those shown in the equation: $P_{1p} \neq O_p$, $P_{1q} \neq O_q$, $P_{2p} \neq O_p$, $P_{2q} \neq O_q$, $P_{1p} + P_{2p} \neq O_p$ in $E_p$, and $P_{1q} + P_{2q} \neq O_q$ in $E_q$.

The additional restrictions in Equation (2) establish consistent operations in $E_p$, $E_q$, and $E_n$. In this equation and throughout this disclosure, the symbol $/\equiv$ represents a non-congruent condition. A point addition where $P_1 \neq P_2$ corresponds to a point addition in $E_p$ where $P_{1p} \neq P_{2p}$ and to a point addition in $E_q$ where $P_{1q} \neq P_{2q}$. The restrictions may not allow, for example, a point addition in $E_n$ to correspond to a point addition in $E_p$ ($P_{1p} \neq P_{2p}$) and to a point double in $E_q$ ($P_{1q} = P_{2q}$). The stated conditions guarantee the existence of the inverses $(x_2 - x_1)^{-1} = [(x_{2p} - x_{1p})^{-1}, (x_{2q} - x_{1q})^{-1}]$ and $(2y_1)^{-1} = [(2y_{1p})^{-1}, (2y_{1q})^{-1}]$ and their computation either directly or using the CRT. Given the inverses relationships, one can verify the following relationships: $\lambda_n = [\lambda_p, \lambda_q]$, $x_3 = [x_{3p}, x_{3q}]$, and $y_3 = [y_{3p}, y_{3q}]$.

$$\lambda_n \equiv (y_2 - y_1)(x_2 - x_1) \bmod n \text{ for } x_1 /\equiv x_2 \bmod p \text{ and } x_1 /\equiv x_2 \bmod q$$

or $$(3x_1^2 + a_n)/(2y_1) \bmod n \text{ for } x_1 \equiv x_2 \bmod p \text{ and } x_1 \equiv x_2 \bmod q$$

$$x_3 \equiv \lambda_n^2 - x_1 - x_2 \bmod n$$

$$y_3 \equiv \lambda_n(x_1 - x_3) - y_1 \bmod n \qquad (2)$$

Equation (2) restricts the points in $E_n$ that can be added. The following sections demonstrate how point addition and point multiplication operations can be performed using point addition in a ring in a way that avoids restricted point additions.

Point Multiplication

For large elliptic curves, point multiplications are computed with iterated point doubles and additions. Algorithm 1 (below) shows the double and add point multiplication algorithm, which is one of the simplest point multiplication algorithms. In Algorithm 1, step 2.1.1 uses a point double and step 2.1.2.1 uses a point addition.

For curves defined over finite fields, the expressions in Equation (1) can be used to compute these operations when $Q \neq O$, $P \neq O$, and $P+Q \neq O$. For curves defined over rings, Algorithm 1 may be modified to comply with the restrictions described above for elliptic curves defined over a ring. Note that in general, a point multiplication is computed with iterated point additions and point doubles.

Point multiplication typically involves the computation of many point doubles and point additions (or point subtractions). When using affine coordinates in point double and point addition operations, inverse operations can be very costly in terms of processing time and memory usage. These inverse operations can be avoided by using projective coordinates. When using projective coordinates, the point double and the point addition operations require a larger number of multiplications and additions than when using affine coordinates but they do not require the computation of inverses. One inverse is required at the end of a point multiplication, when the resulting point is converted back to affine coordinates. Depending on the algorithm and the target performance, one or more additional inverses may be required to represent pre-computed points in affine coordinates.

Point multiplication when using projective coordinates typically involves the following steps: 1) conversion from affine coordinates, $P=(x,y)$, to projective coordinates, $P=(X,Y,Z)$; 2) computation of point multiplication $Q=kP=k(X,Y,Z)$ using classical algorithms but with the point operations done in projective coordinates; and 3) conversion of the resulting point $Q=(X,Y,Z)$ to affine coordinates $Q=(x,y)$. Point multiplication algorithms are well known in the art and in industry standards. Additional examples can be found in G. Orlando, "Efficient Elliptic Curve Processor Architectures for Field Programmable Logic," Ph.D. dissertation, ECE Dept., Worcester Polytechnic Institute, Worcester, Mass., March 2002, incorporated herein by reference.

Two projective coordinates representations, known as homogeneous coordinates and Jacobian coordinates, are described below. To highlight operations on curves defined over rings, the remainder of this disclosure defines curves and points operations in terms of n. These curves and operations are also applicable to embodiments that utilize curves defined over fields. In embodiments utilizing curves defined over fields, n is treated as a prime number.

Algorithm 1: Double and Add Point Multiplication Algorithm

Inputs:

$$k = \sum_{i=0}^{m-1} k_i 2^i \; /^* \; k_i \in [0, 1]^* /$$

$P /^*$ Point on the curve.$^*$ /

Outputs:

$Q = kP$

Processing:

1. /* Initialize variables.* /

1.1 $Q = O$

2. /* Compute the point multiplication* /

2.1 for $i = m - 1$ down to 0 do 2.1.1 $Q = 2Q$ /* Point double* /

2.1.2 if $k_i \neq 0$ then 2.1.2.1 $Q = Q + P$ /* Point addition* /

3. /* Return result.* /

3.1 Return($Q$)

Homogeneous Coordinates

Homogeneous coordinates represent points with three coordinates (X, Y, Z). Points represented in this form satisfy the homogeneous form of the elliptic curve equation shown in Equation (3).

$$Y^2 Z \equiv X^3 + aXZ^2 + bZ^3 \bmod n \qquad (3)$$

The conversion from affine to homogeneous coordinates is trivial. Assuming that $P=(x, y)$, the representation of P in homogeneous coordinates is $P=(X=x, Y=y, Z=1)$. The conversion of $P=(X, Y, Z)$ from homogeneous to affine coordinates is $P=(X/Z, Y/Z)$ provided that the divisions X/Z mod n and Y/Z mod n exist. By convention the point O in homogeneous coordinates is represented by $O=(0, Y, 0)$.

Equation (4) shows expressions for point double, $(X_3, Y_3, Z_3)=2(X_1, Y_1, Z_1)$, and Equation (5) shows expressions for point addition, $(X_3, Y_3, Z_3)=(X_1, Y_1, Z_1)+(X_2, Y_2, Z_2)$.

$(X_3, Y_3, Z_3) = 2(X_1, Y_1, Z_1)$ $w \equiv 3X_1^2 + aZ_1^2 \bmod n$ $X_3 \equiv 2Y_1 Z_1 (w^2 - 8X_1 Y_1^2 Z_1) \bmod n$ $Y_3 \equiv 4Y_1^2 Z_1 (3wX_1 - 2Y_1^2 Z_1) - w^3 \bmod n$ $Z_3 \equiv 8Y_1^3 Z_1^3 \bmod n \qquad (4)$ $(X_3, Y_3, Z_3) = (X_1, Y_1, Z_1) + (X_2, Y_2, Z_2)$ $u \equiv Y_2 Z_1 - Y_1 Z_2 \bmod n$ $v \equiv X_2 Z_1 - X_1 Z_2 \bmod n$ $X_3 \equiv v \{ Z_2 (u^2 Z_1 - 2v^2 X_1) - v^3 \} \bmod n$ $Y_3 \equiv Z_2 (3uv^2 X_1 - v^3 Y_1 - u^3 Z_1) + uv^3 \bmod n$ $Z_3 \equiv v^3 Z_1 Z_2 \bmod n \qquad (5)$ Equations (4) and (5) have the property that the addition of P and −P result in the conventional representation for O: $(X_3, Y_3, Z_3)=(X_1, Y_1, Z_1)+(X_2, Y_2, Z_2)=(0, (-2Y_1 Z_2)^3 Z_1 Z_2, 0)$ when $X_1/Z_1 \equiv X_2/Z_2$ mod n and $Y_1/Z_1 \equiv -Y_2/Z_2$ mod n; and $(X_3, Y_3, Z_3)=2(X_1, Y_1, Z_1)=(0,-(3X_1^2+aZ_1^2)^3, 0)$ when $Y_1/Z_1 \equiv 0$ mod n (i.e., $P_1$ is a point of order two). When adding a point of the form $O=(0, Y, 0)$, the expressions in Equation (4) and Equation (5) yield $O=(0, 0, 0)$, which corresponds to $O=(0, Y, 0)$ with $Y=0$.

The point double expressions yield valid results for $2P=P+(-P)=O$ and $2O=O$. The point addition expressions yield valid result for $P+(-P)=O$ but they yield invalid results for $P+O=P$ when $P \neq O$; for which, the expressions in Equation (5) compute $P+O=O$. The last case is handled explicitly by the point addition operation, which compares the values of the input points against O and depending on the results computes the following: R=P+Q if P≠O, Q≠O, and P≠Q using Equation (5); sets R=P if Q=O; or sets R=Q if P=O. In addition, the point addition operation performs a point double operation using Equation (4) if P=Q.

According to known complexity estimates, a point double operation requires 11 modular multiplications and a point addition requires 12 modular multiplications. These complexity estimates ignore additions because their complexities are usually much lower than the complexities of multiplications.

Jacobian Coordinates

Jacobian coordinates represent points with three coordinates $(X, Y, Z)$. Points represented in this form satisfy the projective form of the elliptic curve equation shown in Equation (6).

$$Y^2 \equiv X^3 + aXZ^4 + bZ^6 \bmod n \qquad (6)$$

The conversion from affine to Jacobian coordinates is trivial. Assuming that $P=(x, y)$, the representation of P in Jacobian coordinates is $P=(X=x, Y=y, Z=1)$. The conversion of $P=(X, Y, Z)$ from Jacobian to affine representation is $P=(X/Z^2, Y/Z^3)$ provided that the divisions $X/Z^2 \bmod n$ and $Y/Z^3 \bmod n$ exist. By convention the point O in Jacobian coordinates is represented by $O=(t^2, t^3, 0)$.

For Jacobian coordinates, Equation (7) shows the expressions for point double, $(X_2, Y_2, Z_2)=2(X_1, Y_1, Z_1)$, and Equation (8) shows the expressions for point addition, $(X_2, Y_2, Z_2)=(X_0, Y_0, Z_0)+(X_1, Y_1, Z_1)$.

$$(X_2, Y_2, Z_2) = 2(X_1, Y_1, Z_1)$$

$$M \equiv (3X_1^2 + aZ_1^4) \bmod n$$

$$Z_2 \equiv 2Y_1 Z_1 \bmod n$$

$$S \equiv 4X_1 Y_1^2 \bmod n$$

$$X_2 \equiv M^2 - 2S \bmod n$$

$$T \equiv 8Y_1^4 \bmod n$$

$$Y_2 \equiv M(S - X_2) - T \bmod n \qquad (7)$$

$$(X_2, Y_2, Z_2) = (X_0, Y_0, Z_0) + (X_1, Y_1, Z_1)$$

$$U_0 \equiv X_0 Z_1^2 \bmod n$$

$$S_0 \equiv Y_0 Z_1^3 \bmod n$$

$$U_1 \equiv X_1 Z_0^2 \bmod n$$

$$S_1 \equiv Y_1 Z_0^3 \bmod n$$

$$W \equiv U_0 - U_1 \bmod n$$

$$R \equiv S_0 - S_1 \bmod n$$

$$T \equiv U_0 + U_1 \bmod n$$

$$M \equiv S_0 + S_1 \bmod n$$

$$Z_2 \equiv Z_0 Z_1 W \bmod n$$

$$X_2 \equiv R^2 - TW^2 \bmod n$$

$$V \equiv TW^2 - 2X_2 \bmod n$$

$$Y_2 \equiv (VR - MW^3)/2 \bmod n \qquad (8)$$

Equations (7) and (8) have the property that the addition of P and −P result in the conventional representation for O: $(X_2, Y_2, Z_2) = (X_0, Y_0, Z_0) + (X_1, Y_1, Z_1) = (t^2, t^3, 0)$ where $t \equiv -2Y_1 Z_0^3$ when $X_0/Z_0^2 \equiv X_1/Z_1^2 \bmod n$ and $Y_0/Z_0^3 \equiv -Y_1/Z_1^3 \bmod n$; and $(X_2, Y_2, Z_2) = 2(X_1, Y_1, Z_1) = (t^2, t^3, 0)$ where $t \equiv -(3X_1^2 + aZ_1^4)$ when $Y_1/Z_1^3 \equiv 0 \bmod n$ (i.e., $P_1$ is a point of order two).

When adding a point of the form $O=(u^2, u^3, 0)$, the expressions in Equation (7) yield $2O=(t^2, t^3, 0)$, which matches the expected result. When adding a point of the form $O=(u^2, u^3, 0)$, the expressions in Equation (8) yield P+O=O=(0,0,0), which corresponds to $O=(t^2, t^3, 0)$ with t=0, instead of the expected result P+O=P when P≠O. The last case is handled explicitly by the point addition operation, which compares the values of the input points against O and depending on the results computes the following: R=P+Q if P≠O, Q≠O, and P≠−Q using Equation (8); sets R=P if Q=O; or sets R=Q if P=O. In addition, the point addition operation performs a point double operation using Equation (7) if P=Q.

When using Jacobian coordinates, a point double operation requires 10 modular multiplications if a/≡−3 mod n and 8 modular multiplications if a≡−3 mod n. Point addition requires 16 field multiplications when $Z_1 \not\equiv 1$ mod n and 11 field multiplications when $Z_1 \equiv 1$ mod n. Some standards, such as FIPS 186-2, suggest the use of curves for which a≡−3 mod n.

Point double is the most common operation in point multiplication. As a consequence, Jacobian coordinates lead to faster point multiplications than homogeneous coordinates for curves for which a≡−3 mod n and for point multiplications that yield both the x and y coordinates of the resulting points. Some algorithms, usually specified in terms of homogenous coordinates, do not use the y coordinates of the resulting points or can recover them. Examples of these algorithms can be found in N. Demytko, "A New Elliptic Curve Based Analogue of RSA," Advances in Cryptology—Eurocrypt '93 (LNCS 765), pp. 40-49, Springer-Verlag, 1994 (hereinafter "Demytko"), and also in E. Brier et al., "Weierstrass Elliptic Curves and Side-Channel Attacks," Public Key Cryptography (LNCS 2274), pp. 335-345, Springer-Verlag, 2002, both of which are incorporated by reference herein.

Verification of Decryption Computations

The elliptic curve point additions and point multiplications described above are the basic mathematical operations used in elliptic curve cryptography. These operations are routinely applied, for example, in computerized cryptography systems when implementing key agreement protocols for secure communications. During implementation, erroneous computations can sometimes arise as a result of random errors, or as a result of errors maliciously induced by an attacker or active adversary. Thus, for security purposes, it is often desirable to perform independent verification of a computation in order to increase system reliability.

In a conventional system, reliable computation can be achieved with two redundant engines that independently perform the same computation or with a single engine that performs the same computation twice. If the results from the two operations match, the common result is assumed to be correct, and the communication is deemed reliable and secure. The main problem with these approaches is that they double the complexity of an already complex, time-consuming, and memory-intensive operation.

SUMMARY

Methods of reliability computation for elliptic curve cryptography (ECC) systems perform two operations according to the present invention. The complexity of the first operation is slightly higher than the complexity of an operation computed in a conventional system. The complexity of the second operation is a function of the desired degree of reliability, or the desired probability of failure detection. In general, the second operation is of much lower complexity than the first operation, thus, the first and second operations are asymmetric. The processing requirements, or total number of calculations performed by the combination of the asymmetric operations are significantly less demanding than the sum of redundant operations performed in a conventional reliability computation.

One embodiment of the method validates a point addition computation involving one or more points on a specified elliptic curve. The method comprises steps for selecting a second elliptic curve to serve as a validation curve, deriving a third elliptic curve from the specified and selected curves, and projecting points onto the derived curve. Each point projected onto the derived curve is a tuple comprising a point from the specified curve and a point from the selected curve. The method includes steps for performing a computation on the derived curve involving the projected points, validating the computation on the selected curve, extracting from the computation on the derived curve a predicted result of the computation on the selected (validation) curve, and comparing the predicted result to the validation computation performed on the selected curve. In additional steps, a predicted result of the computation to be validated may then be extracted from the computation on the derived curve. The predicted result may then be compared to an actual result of a computation on the second curve, and if the results match, the predicted result of the computation performed on the selected curve is validated.

Another embodiment of a method of the present invention validates a point multiplication computation involving one or more points on a specified elliptic curve. The method comprises steps for selecting a second elliptic curve to serve as a validation curve, deriving a third elliptic curve from the specified and selected curves, and projecting points onto the derived curve. Each point projected onto the derived curve is a tuple comprising a point to be multiplied from the specified curve and a fixed point from the selected curve that is used to establish the reliability of the point multiplication. The method includes steps for generating an addition chain for a multiplier that avoids invalid points, such as a point at infinity, or a point double in the selected curve that does not map to a point double in the specified curve. Additional method steps comprise computing a point multiplication on the derived curve, computing one or more point multiplication validations on the selected curve, extracting from the computation on the derived curve a predicted result for each computation performed on the selected (validation) curve, and comparing each predicted result to its corresponding actual result obtained from multiplication performed on the selected curve. In additional steps, a predicted result of the point multiplication computation to be validated may then be extracted from the computation on the derived curve. The predicted result may then be compared to an actual result of a computation on the second curve, and if the results match, the predicted result of the computation performed on the selected curve is validated.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The invention can be better understood with reference to the following figures. The components in the figures are not necessarily to scale, emphasis instead being placed upon illustrating the principles of the invention.

FIGS. 8A-8B show a tabulation of relevant cases of employing a recoding adjustment algorithm in a method according to the invention.

FIG. 9 shows a tabulation of a recoding example using an adjusted addition chain in a reliable point multiplication method according to the invention, for k=30, $n_q$=5 and w=1.

FIG. 10 shows a tabulation of results of a recoding reliable point multiplication algorithm according to the invention, including the probability of estimation error for k∈[1, $2^{16}$).

FIG. 11 shows a tabulation of results of a recoding reliable point multiplication algorithm according to the invention, including the probability of estimation error for $2^{16}$ random k values in the range [1, $2^{192}$).

DETAILED DESCRIPTION

As utilized herein, it should be appreciated that terms such as "selecting", "deriving", "projecting", "providing", "performing", "comparing", "extracting", "validating" and the like, refer to the action and process of a computer system or electronic processing device that transforms data that is stored within the computer system's memory or that is otherwise accessible by the computer system.

As used herein, the term "software" includes source code, assembly language code, binary code, firmware, macro-instructions, micro-instructions, or the like, or any combination of two or more of the foregoing.

The term "memory" refers to any processor-readable medium, including but not limited to RAM, ROM, PROM, EPROM, EEPROM, disk, floppy disk, hard disk, CD-ROM, DVD, flash memory, or the like, or any combination of two or more of the foregoing, which may store data accessible by a processor such as a series of software instructions executable by a processor.

The terms "processor" refers to any device capable of executing a series of instructions and includes, without limitation, a CPU, a general- or special-purpose microprocessor, a finite state machine, a controller, computer, digital signal processor (DSP), or the like.

The term "logic" refers to implementations in hardware, software, or combinations of hardware and software.

The various embodiments disclosed herein use non-singular elliptic curves. With respect to elliptic curves defined over a field, this requires that g.c.d.$(4a_p^3+27b_p^2, p)=1$. With respect to elliptic curves defined over a ring, this requires that g.c.d.$(4a_n^3+27b_n^2, n)=1$, n=pq be square free (i.e., p≠q), and that p and q be odd. Although the many embodiments described herein focus on n=pq, the results can be expanded to the case where n=$p_1*p_2* \ldots p_r$. The notation g.c.d. refers to the greatest common divisor operation.

The mathematical operation "point addition" refers to either the addition or subtraction operation; however, for simplicity, the various exemplary embodiments show point addition operations only. Those skilled in the art will appreciate that embodiments according to the invention may also involve point subtraction.

Block Diagram

Figure 1:
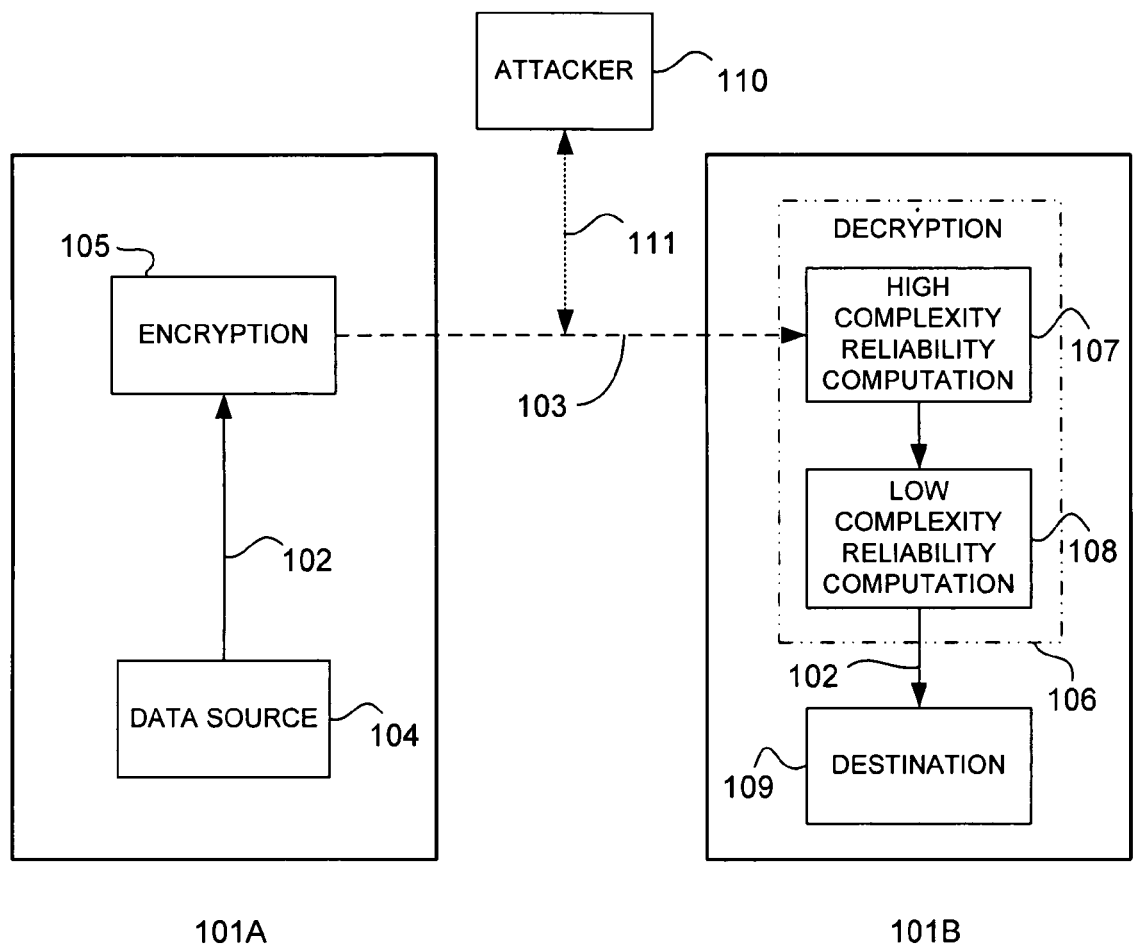
FIG. 1 is a block diagram embodiment of a two-party communication system, or method, employing reliability computation according to the invention.

FIG. 1 illustrates a basic block diagram 100 of a two-party communication system using message encryption/decryption and employing reliability computation according to the invention. Two parties, sender 101A and receiver 100B desire to communicate information 102 confidentially over a communications channel 103. Channel 103 may represent a secured or unsecured channel. Sender 101A generates information 102 from a data source 104. Source 104 may be any source or subsystem capable of storing and/or transmitting digital information such as a computer, cellular telephone or other device or communications system having cable or wireless transmission capability. In block 105, information 102 is encrypted, for example, by an ECC technique, prior to transmission over channel 103. A data transmission error signal 111 may or may not corrupt information 102 on channel 103. Error signal 111 may occur as a random error introduced by a transmission anomaly, or an attacker or adversary 110 may maliciously introduce it.

In block 106, receiver 101B decrypts the information received, for example, by means of point multiplication operations discussed above. In order to verify the authenticity of the signal received over channel 103, block 106 performs reliable ECC computations in accordance with the present invention. Reliable ECC computations are disclosed in greater detail in the following sections. Block 106 comprises reliability computation blocks 107 and 108. In block 107, a high complexity reliability computation is performed that is of slightly higher complexity than a computation performed according to a conventional ECC decryption algorithm. In block 108, a low complexity reliability computation is performed to verify the result obtained in block 107. The computation performed in block 108 is of much lower complexity than a computation performed according to a conventional ECC decryption algorithm. Thus, the total number of calculations performed by the combination of blocks 107 and 108 is significantly lower than twice the number of calculations performed by a conventional operation.

Having decrypted the signal received and having verified its authenticity by means of reliable ECC computation, receiver 101B receives information signal 102 at its destination block 109. Destination block 109 may represent any device or subsystem capable of storing and/or receiving digital information such as a computer, cellular telephone or other device or communications system having cable or wireless receiving capability. In one or more embodiments, sender 101A and/or receiver 101B each comprise a system having a processor coupled to memory, such as a computer system. In these embodiments, data source block 104 and/or destination block 109 may be integral to the computer system, or they may be peripheral devices coupled thereto. Encryption block 105, decryption block 106, and computation blocks 107 and 108 may represent individual processors or other logic devices capable of executing one or more reliable ECC computation algorithms as a series of software instructions, or they may represent memory capable of storing the software instructions that is accessible by a processor. It should be noted that the diagram of FIG. 1 is exemplary only. Other embodiments according to the invention are possible, for example, one in which sender 101A and receiver 101B exchange information, wherein both parties include means or steps for performing the reliable ECC computation algorithms.

Reliable Point Addition (RPA)

One embodiment of the invention comprises a reliable computation method for the addition of points belonging to curves defined over prime fields $F_p$. Hereinafter embodiments of this method are referred to as Reliable Point Addition (RPA).

The goal of an RPA method is to reliable compute the addition $Q_p=P_{1p}+P_{2p}$, where $P_{1p}, P_{2p} \in E_p$. To achieve this result, an RPA method computes the following two point additions: $Q_n=P_{1n}+P_{2n}$ and $Q_q=P_{1q}+P_{2q}$, where $P_{1n}=[P_{1p}, P_{1q}]$, $P_{2n}=[P_{2p}, P_{2q}] \in E_n$ and $P_{1q}, P_{2q} \in E_q$. If the restrictions described above regarding elliptic curves defined over a ring are satisfied, the result $Q_p$ can be derived from $Q_n=[Q'_p, Q'_q]$ by reducing the coordinates of $Q_n$ modulo p. The derived $Q'_p$ is assumed to be correct if the $Q'_q$ derived from $Q_n$ matches the independently computed $Q_q$.

Figure 2:
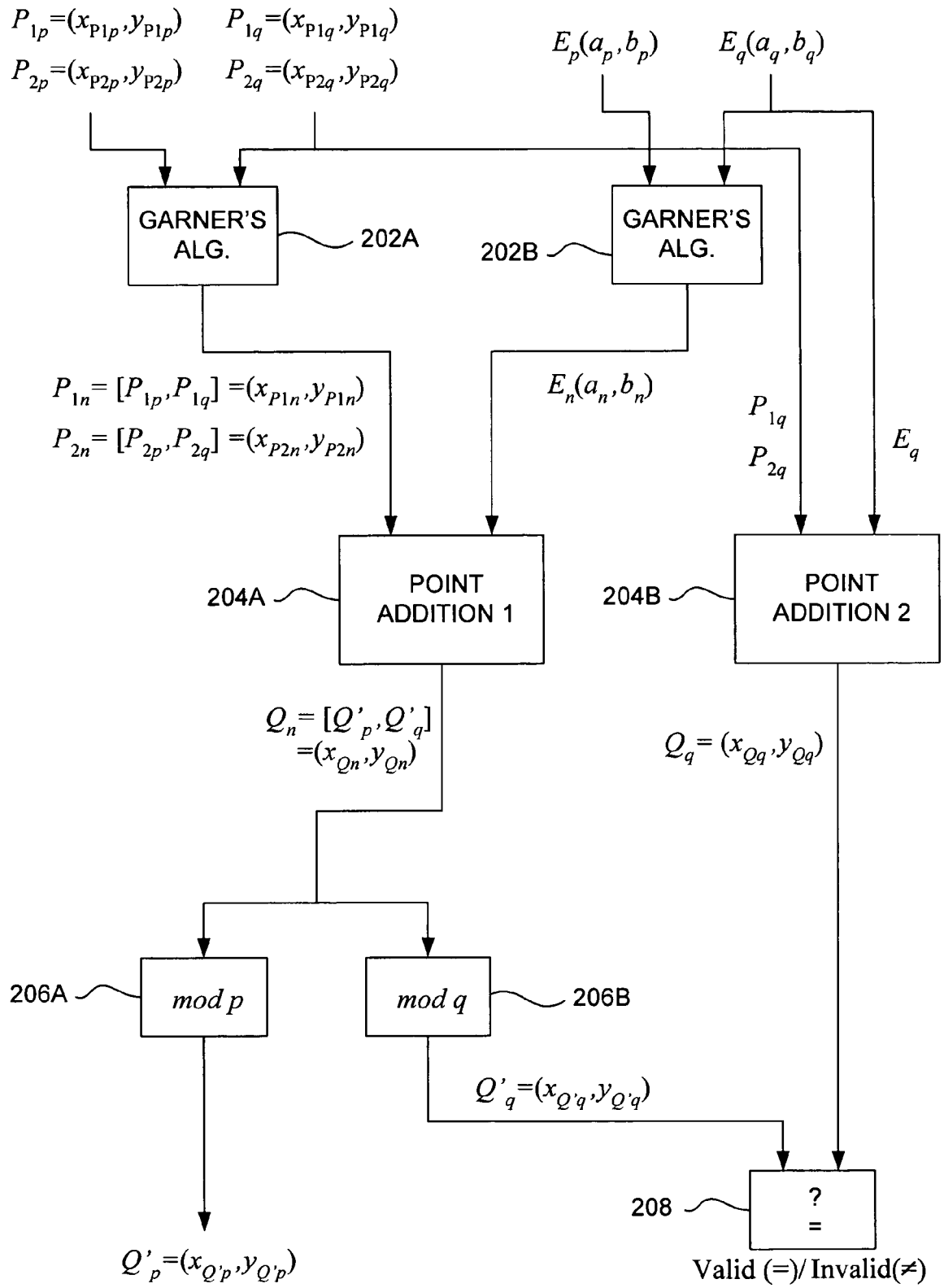
FIG. 2 is a block diagram of one embodiment of a reliable point addition method according to the present invention.

FIG. 2 shows an RPA method 200 according to the invention as it is applied to the computation of $Q_p=P_{1p}+P_{2p}$. The first set of steps are steps 202A and 202B. In step 202A, points $P_{1p}$ and $P_{1q}$ are projected onto $P_{1n}$ and the points $P_{2p}$ and $P_{2q}$ are projected onto $P_{2n}$. These steps may comprise application of a cryptographic algorithm such as Garner's Algorithm. In step 202B, curve $E_n$ is derived from $E_p$ and $E_q$. Note that step 202B need only be performed once for given curves $E_p$ and $E_q$. The second set of steps are point addition steps 204A and 204B. Step 204A computes $Q_n=P_{1n}+P_{2n}$ and step 204B computes $Q_q=P_{1q}+P_{2q}$. The third set of steps are steps 206A and 206B. Step 206A derives $Q'_p$ from $Q_n$ and step 206B derives $Q'_q$ from $Q_n$. The final step is step 208, which validates the result $Q'_p$ by comparing $Q'_q$ and $Q_q$. If $Q'_q=Q_q$, the result $Q'_p$ is assumed to be correct.

Another embodiment of an RPA method according to the invention is shown below in Algorithm 2. Algorithm 2 assumes that $n_p=\#E_p$ and $n_q=\#E_q$, as it is the case for curves recommended in FIPS 186-2. FIG. 2 and Algorithm 2 make reference to Garner's algorithm, which finds the solutions x to the system of congruences $x \equiv x_p$ mod p and $x \equiv x_q$ mod q. Cryptographic algorithms such as Garner's algorithms are well known in the art, and can be found, e.g. in Menezes.

Given the restrictions for elliptic curves defined over a ring, choose $P_{1q}=P_{2q}$ if $P_{1p}=P_{2p}$ and choose $P_{1q} \neq P_{2q}$ if $P_{1p} \neq P_{2p}$.

Algorithm 2: RPA Algorithm

Inputs:

$E_p$ Elliptic curve specified for point addition. Curve parameterized by $a_p$, $b_p$, p, $\#E_p$.

$E_q$ Elliptic curve used to validate results. Curve parameterized by $a_q$, $b_q$, q, $\#E_q$.

$E_n$ Elliptic curve used to compute point addition. Curve parameterized by $a_n$, $b_n$, p, q, n=pq. Input provided if curve is already defined, otherwise the algorithm computes the parameters for this curve.

$P_{1p}$, $P_{2p}$ Points to add in $E_p$, where $P_{1p} \neq O_p$, $P_{2p} \neq O_p$, and $P_{1p}+P_{2p} \neq O_p$.

$P_{1q}$, $P_{2q}$ Points to add in $E_q$, where $P_{1q} \neq O_q$, $P_{2q} \neq O_q$, and $P_{1q}+P_{2q} \neq O_p$, and where $P_{1q}=P_{2q}$ if $P_{1p}=P_{2p}$ and $P_{1q} \neq P_{2q}$ if $P_{1p} \neq P_{2p}$.

Outputs:

$E_n$ Elliptic curve specified for point addition. Output only if it has not been previously defined.

$Q_p$ Point addition result.

result_is_valid True if the result is presumed to be valid and False otherwise.

Processing:

1. /* Compute parameters for $E_n$ if they are not already defined. */

/* Typically done only once for a given set of curves $E_p$ and $E_q$. */

1.1 if $E_n$ is not defined then 1.1.1 n=pq 1.1.2 $a_n$=garner($a_p$, $a_q$, p, q) /* $a_p \equiv a_n$ mod p, $a_q \equiv a_n$ mod q */

1.1.3 $b_n$=garner($b_p$, $b_q$, p, q) /* $b_p \equiv b_n$ mod p, $b_q \equiv b_n$ mod q */

2. /* Compute $P_{1n}$ and $P_{2n}$. */

2.1 $x_{P1n}$=garner($x_{P1p}$, $x_{P1q}$, p, q) /* $x_{P1p} \equiv x_{P1n}$ mod p, $x_{P1q} \equiv x_{P1n}$ mod q */

2.2 $y_{P1n}$=garner($y_{P1p}$, $y_{P1q}$, p, q) /* $y_{P1p} \equiv y_{P1n}$ mod p, $y_{P1q} \equiv y_{P1n}$ mod q */

2.3 $x_{P2n}$=garner($x_{P2p}$, $x_{P2q}$, p, q) /* $x_{P2p} \equiv x_{P2n}$ mod p, $x_{P2q} \equiv x_{P2n}$ mod q */

2.4 $y_{P2n}$=garner($y_{P2p}$, $y_{P2q}$, p, q) /* $y_{P2p} \equiv y_{P2n}$ mod p, $y_{P2q} \equiv y_{P2n}$ mod q */

3. /* Compute $Q_n=P_{1n}+P_{2n}=(x_{Qn}, y_{Qn})$. */

3.1 $Q_n$=point_addition($P_{1n}$, $P_{2n}$, $E_n$)

4. /* Compute $Q_q=P_{1q}+P_{2q}=(x_{Qq}, y_{Qq})$. */

4.1 $Q_q$=point_addition($P_{1q}$, $P_{2q}$, $E_q$)

5. /* Derive $Q'_p$ and $Q'_q$ from $Q_n$. */

5.1 $Q'_p=(x_{Q'p} \equiv x_{Qn}$ mod p, $y_{Q'p} \equiv y_{Qn}$ mod p)

5.2 $Q'_q=(x_{Q'q} \equiv x_{Qn}$ mod q, $y_{Q'q} \equiv y_{Qn}$ mod q)

6. /* Compare results $Q_q$ and $Q'_q$ and set error status. */

6.1 if ($x_{Qq} \equiv x_{Q'q}$ mod q) and ($y_{Qq} \equiv y_{Q'q}$ mod q) then result_is_valid=True 6.2 else result_is_valid=False 7. /* Return result. */

7.1 return ($Q'_p$, $E_n$, result_is_valid)

The points of interest in $E_n$ are the points $P_n=[P_p, P_q]$, where $P_p \in E_p$, $P_q \in E_q$, $P_p \neq O_p$, and $P_q \neq O_q$, together with the point at infinity $O_n=[O_p, O_q]$. All other points are considered invalid points. Given that there are #$E_p$ points in $E_p$, including the point at infinity, and #$E_q$ points in $E_q$, including the point at infinity, the total number of points of interest in $E_n$ is (#$E_p$−1)*(#$E_q$−1)+1 (~#$E_p$#$E_q$). Assuming that the $Q'_q$ matches $Q_q$, the probability that result is assumed to be right when in fact it is wrong is approximately 1/#$E_q$. Note that in the set of points of interest there are #$E_p$−1 points $P_p$ that correspond to a given point $P_q$.

The curve $E_q$ influences the probability of detecting failures. This curve need not be a cryptographically secure curve; it need only contain enough points to satisfy the desired detection probability. From an implementation perspective, it would also be beneficial to choose curve parameters that minimize the computational complexity of the operations in $E_n$ and $E_q$. For example, q can be chosen so that it minimizes the complexity of the modular operations required to compute point additions.

The point addition $Q_n=P_{1n}+P_{2n}$ is expected to be slightly more complex than the point addition $Q_p=P_{1p}+P_{2p}$. The complexity of the point addition $Q_q=P_{1q}+P_{2q}$ is expected to be much lower than the complexity of the point addition $Q_p=P_{1p}+P_{2p}$. In addition to these point operations, the RPA requires at least four computations involving Garner's algorithm (step 2) and four reductions (step 5).

RPA Example

Figure 3:
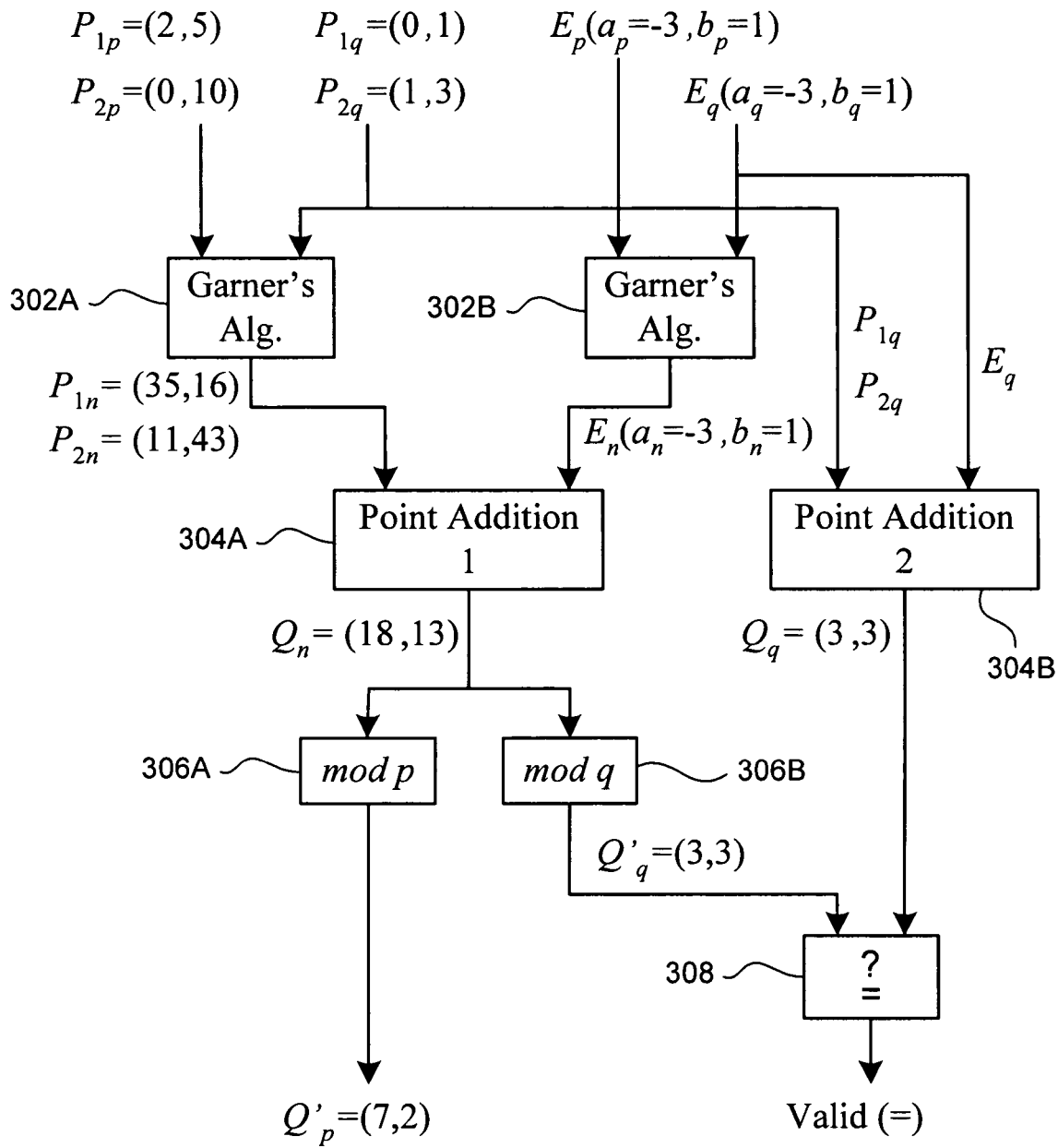
FIG. 3 illustrates one example of a reliable point addition method according to the invention that yields a valid result for p=11, q=5, and n=55.

FIG. 3 illustrates an RPA example 300. Steps 302A, 302B, 304A, 304B, 306A, 306B and 308 correspond to like-numbered steps of method 200. In RPA example 300, a valid result is achieved for p=11, q=5, and n=55. However, an RPA computation may not guarantee a valid result. Furthermore, an invalid result or failure may be detectable or undetectable.

An example of a detectable failure is the following: If there is a failure in the Point Addition 1 that results, for example, in $Q_n$=(38,32), which is a point in $E_n$, then $Q'_q$ would be (3,2) and the check will determine that the derived $Q'_p$=(5,10) is an invalid result.

An example of an undetectable failure is the following: If there is a failure in the Point Addition 1 that results, for example, in $Q_n$=(48,3), which is a point in $E_n$, $Q'_q$ would be (3,3) and the check will assume that the derived $Q'_p$=(4,3) is a valid result when in reality it is not. There are about #$E_p$ points that would satisfy the check out of about #$E_p$#$E_q$ points of interest in $E_n$; therefore, the probability of detecting a random failure that results in a point of interest is approximately 1/# $E_q$.

Figures 4A, 4B:
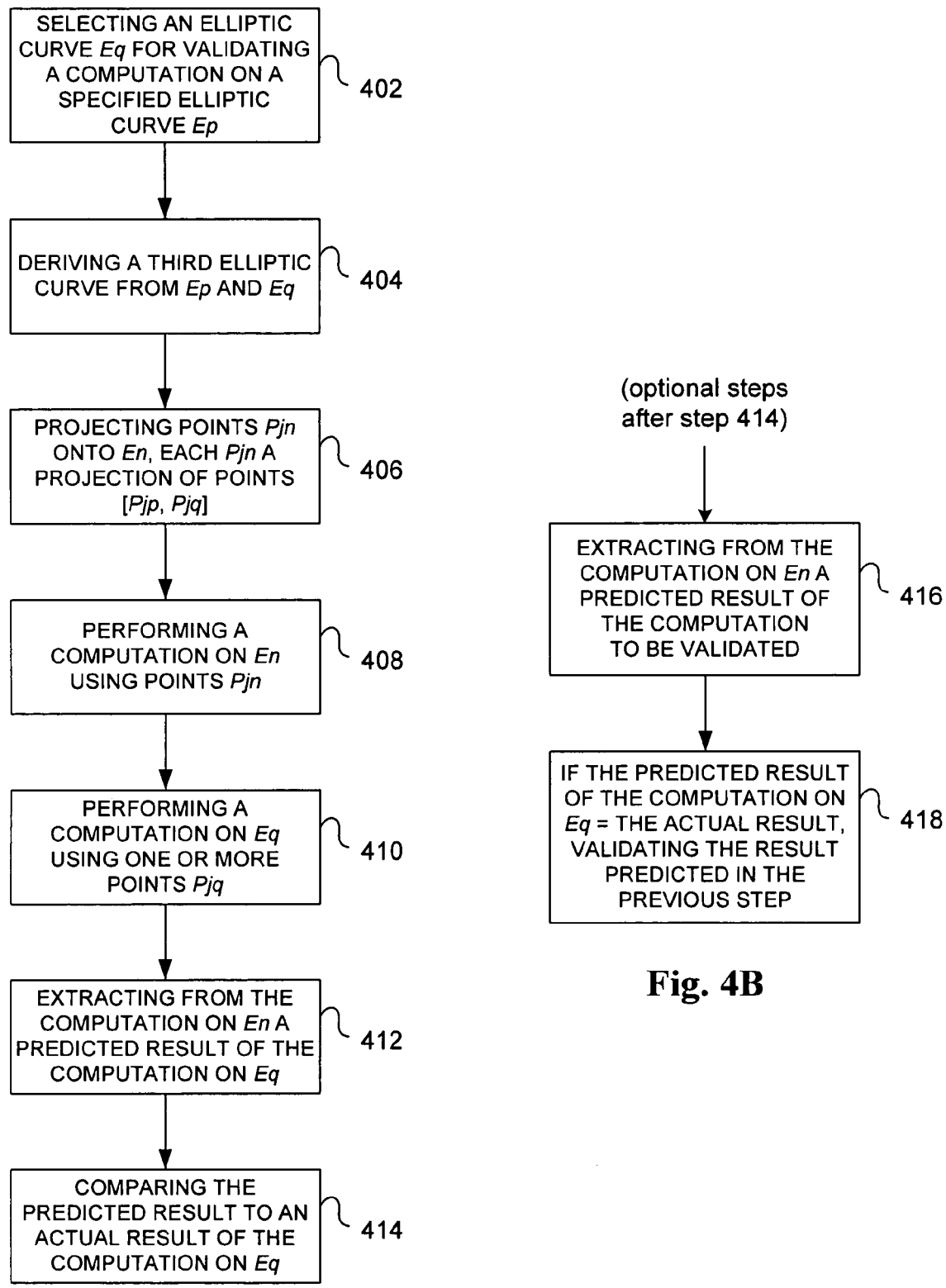
FIG. 4A illustrates one embodiment of a reliable point addition method according to the invention.
FIG. 4B illustrates optional process steps for the method of FIG. 4A.

FIG. 4 illustrates another embodiment of a method 400 according to the invention for validating a computation involving one or more points on a specified elliptic curve $E_p$. Method 400 begins with step 402, which comprises selecting a second elliptic curve $E_q$. Preferably, curve $E_q$ is selected to achieve a desired balance between validation accuracy and the computational complexity of the operations in $E_n$ and $E_q$. The next step 404 comprises deriving a third elliptic curve, $E_n$, from curves $E_p$ and $E_q$. As previously discussed in method 200, curve $E_n$ may be derived by means of an appropriate cryptographic algorithm such as Garner's Algorithm.

The same or a similar algorithm may be employed in the next step 406, which comprises projecting one or more points $Pj_n$ onto $E_n$. Each point $Pj_n$ is a projection of a set of points [$Pj_p$, $Pj_q$] where $Pj_p \in E_p$, $Pj_q \in E_q$, and j=1 to t (t an integer). The next two steps are similar. Step 408 comprises performing a computation on $E_n$ involving the one or more projected points $Pj_n$. In one implementation, this computation comprises a point addition computation that yields a result $Q_n=P_{1n}+P_{2n}$. Step 410 comprises performing a computation on $E_q$ involving one or more points $Pj_q$. In one implementation, the computation in step 410 computes $Q_q=P_{1q}+P_{2q}$. The next step is step 412. Step 412 comprises extracting from the computation on $E_n$ a predicted result of the computation on $E_q$. This step is illustrated above, for example, as step 206B of method 200. In the final step 414 of method 400, the predicted result from the previous step is compared to an actual result of the computation on $E_q$.

The following additional steps may be performed in a method 400 according to the invention. After step 414, step 416 may comprise extracting, from the computation on $E_n$, a predicted result of the computation to be validated. In one implementation, the computation to be validated is the point addition $Q_p=P_{1p}+P_{2p}$. In step 418, a determination is made whether the predicted result of the computation on $E_q$ equals the actual result of the computation on $E_q$, and if so, validating the result predicted in step 416.

Reliable Point Multiplication (RPM)

Another embodiment of the invention comprises a reliable computation method for point multiplications for curves defined over prime fields $F_p$. Hereinafter embodiments of this method are referred to as Reliable Point Multiplication (RPM).

Figure 5:
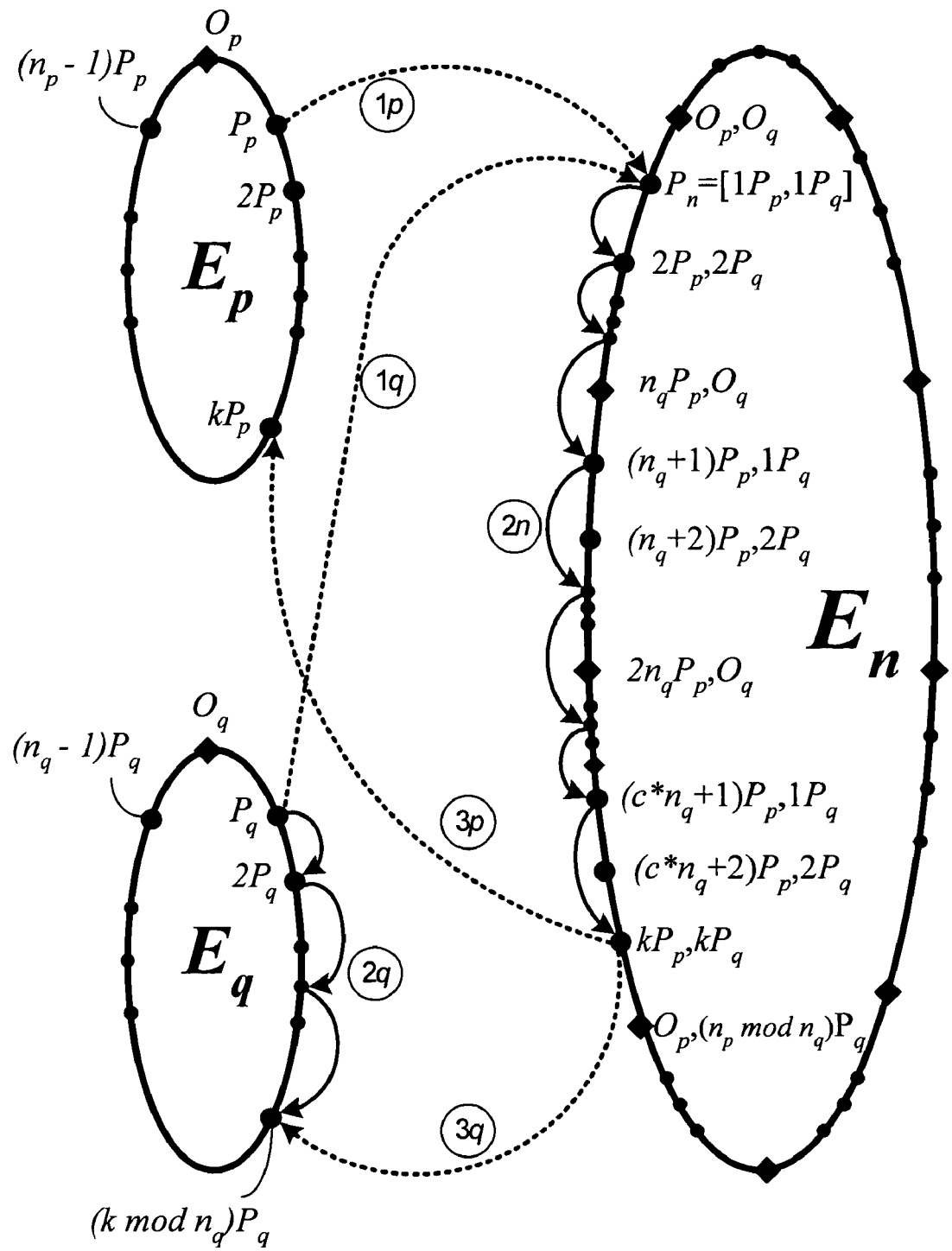
FIG. 5 shows a conceptual diagram including steps for implementing a reliable point multiplication method according to the invention.

FIG. 5 shows one embodiment of an RPM method as it is applied to the computation of $kP_p$ on an elliptic curve $E_p$. This curve is modeled in the figure as an ellipse labeled $E_p$. A second elliptic curve is selected, and is modeled in the figure as an ellipse labeled $E_q$. A third elliptic curve is derived from $E_p$ and $E_q$, and is modeled as the larger ellipse labeled $E_n$.

The steps in FIG. 5 are illustrated conceptually by dashed lines and solid lines. The first step is to project points $P_p$ and $P_q$ onto $P_n$. This step is illustrated by the dashed lines labeled "1p" and "1q" that project to point $P_n=[1P_p, 1P_q]$ on curve $E_n$. The figure shows points in $E_n$ including $P_n$, as tuples of the form $P_n=[P_p, P_q]$ that indicates their projections onto $E_p$ and $E_q$. $P_p$ is the point on $E_p$ of order $n_p$ that is to be multiplied, and $P_q$ is a fixed point on $E_q$ of order $n_q$ that is used to establish the reliability of the point multiplication. The figure uses diamonds to represent points $P_n=[P_p, P_q]$ for which $P_p$ or $P_q$ are the points at infinity in $E_p$ or $E_q$. This embodiment of RPM requires that $n_p$ and $n_q$ be coprime (i.e. no factors in common) and that they be odd.

The second step is illustrated by the sequence of solid lines labeled "2n" and by the sequence of solid lines labeled "2q". The "2n" portion of this step computes $kP_n$ on $E_n$ using an addition chain that avoids points $iP_n$ where $i$ is a multiple of $n_q$ or $n_p$. This addition chain must also preclude point additions that project to point doubles in either $E_p$ or $E_q$ (but not in both) for applications that require the use of distinct operations for point doubles and point additions. This is one of the restrictions discussed in the context of elliptic curves defined over a ring. The "2q" portion of this step also computes $(k \bmod n_q)P_q$ on $E_q$, as illustrated.

The third step is illustrated by the dashed lines labeled "3p" and "3q". The "3p" portion of this step projects the resulting point $kP_n$ onto $kP_p$ on $E_p$. The "3q" portion of this step projects the resulting point $kP_n$ onto $kP_q$ on $E_q$. In the final step (not illustrated), the projected result $kP_q$ is compared against the independently computed $(k \bmod n_q)P_q$, and, if the results match, the projected point $kP_p$ is assumed to be the desired result.

The space of valid results $Q_n=[Q'_p,Q'_q]$ for multiplications $kP_n$ consists of approximately $n_p \, n_q$ points. For a given point $Q'_q$ there are $n_p$ valid points $Q'_p$. An RPM method according to the invention detects invalid results for which $Q_q \neq Q'_q$, but it fails to detect invalid results for which $Q_q = Q'_q$. Given that there are about $n_p$ points that satisfy the last condition and that there are about $n_p \, n_q$ points of interest in $E_n$, the probability of failing to detect invalid results that map to points of interest in $E_n$ is approximately $1/n_q$ when considering failures with equal likelihood.

Figure 6:
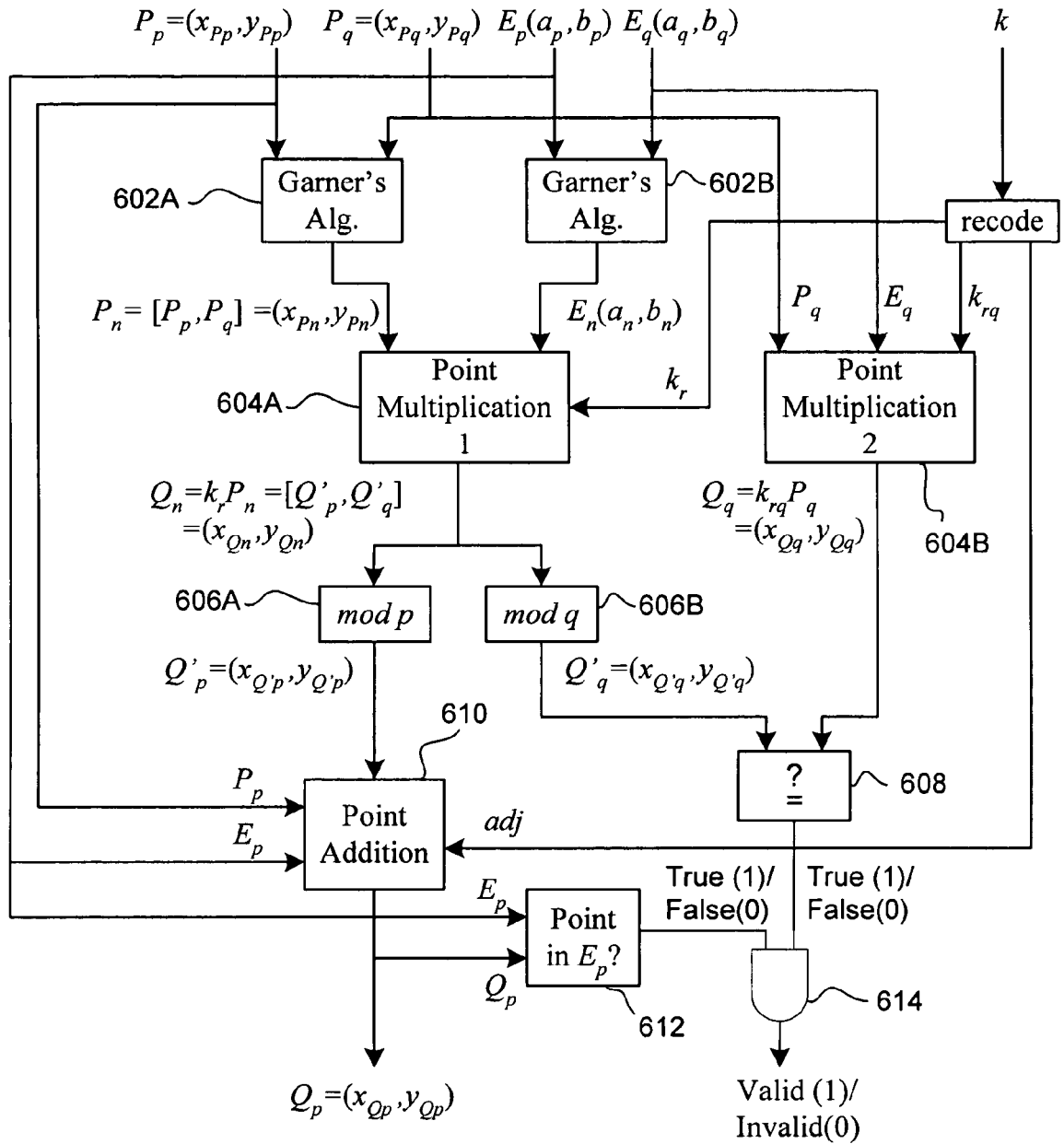
FIG. 6 is a block diagram of one embodiment of a reliable point multiplication method according to the present invention.

FIG. 6 shows an RPM method 600 according to the invention as it is applied to the computation of $kP_p$ on $E_p$. The first set of steps are steps 602A and 602B. In step 602A, points $P_p$ and $P_q$ are projected on $P_n$ using an appropriate cryptographic algorithm such as Garner's Algorithm. In step 602B, curve $E_n$ is derived from $E_p$ and $E_q$. The second set of steps are point multiplication steps 604A and 604B. Step 604A computes $Q_n=k_rP_n$ and step 204B computes $Q_q=k_{rq}P_q$. The third set of steps are steps 606A and 606B. Step 606A derives $Q'_p$ from $Q_n$ and step 606B derives $Q'_q$ from $Q_n$. Next, in step 608, the results for $Q_q$ and $Q'_q$ are compared. If $Q'_q=Q_q$, the result $Q'_p$ is assumed to be valid. In the next step 610, if necessary to avoid an undesirable point, the result $Q'_p$ is adjusted using the recode parameter adj to obtain $Q_p$. This is achieved by the point addition on $E_p$: $Q_p=Q'_p+\text{adj}*P_p$. Next, in step 612, a check is performed to determine whether the resulting point $Q_p$ exists on curve $E_p$. In the final step 614, appropriate logic, such as an AND gate, is used to determine whether there has been a valid result. If the result in step 608 and the result for step 612 are both true, then a logical one is output. If the result of either step 608 or step 612 is false, then a logical zero is output.

The block diagram of method 600 covers the case shown in FIG. 5 along with the cases for which a final result is adjusted. A final result may need to be adjusted to avoid an undesirable point double in $E_q$ that does not map to a point double in $E_p$. The final result also needs to be adjusted when $k \equiv 0 \bmod n_q$, a condition that cannot be avoided with the addition chain mentioned previously. When using unsigned addition chains, multiples of $n_p$ can be avoided by reducing k modulo $n_p$ at the beginning of the point multiplication.

When $k \equiv 0 \bmod n_q$, $kP_q=O_q$. To support this case, the RPM method can compute the following point multiplications: $Q_n=[Q'_p, Q'_q]=k_rP_n$ and $Q_q=k_{rq}P_q$, where $k_r=k-\text{adj}$, $k_r \not\equiv 0 \bmod n_q$, and $k_{rq}=k_r \bmod n_q$. If $Q_q=Q'_q$, the result $Q'_p$ is assumed to be valid. The final result is computed as follows: $Q_p=Q'_p+\text{adj}*P_p$. To verify that errors are not introduced in this final step, a check is done to verify that $Q_p$ is in $E_p$.

The addition chain may represent k as the sum $k_r+\text{adj}$, when it needs to avoid point additions that result in a point double in either $E_p$ or $E_n$ (but not on both). The following discussion assumes that $n_p$ is prime and very large as it is the case for the curves specified in FIPS 186-2. When using unsigned addition chains with these curves, the condition to avoid is a point addition that projects to a point double in $E_q$ and to a point addition in $E_p$.

Algorithm 3 discloses additional details concerning RPM computation performed in accordance with the block diagram of FIG. 6.

Algorithm 3: RPM Algorithm

Inputs:

$E_p$ Elliptic curve specified for point multiplication. Curve parameterized by $a_p$, $b_p$, p, $\#E_p$.

$E_q$ Elliptic curve used to validate results. Curve parameterized by $a_q$, $b_q$, q, $\#E_q$.

$E_n$ Elliptic curve used to compute point multiplication. Curve parameterized by $a_n$, $b_n$, p, q, n=pq. Input provided if curve is already defined, otherwise the algorithm computes the parameters for this curve.

$P_p$ Base point for point multiplication. Order of point is $n_p$. FIPS 186-2 recommends points with prime order $n_p$.

$P_q$ Base point for redundant computation. Order of point is $n_q$, where $\gcd(n_p, n_q)=1$.

k Point multiplier.

Outputs:

$E_n$ Elliptic curve specified for point multiplication. Output only if it has not been previously defined.

$Q_p$ Point multiplication result.

result_is_valid True if the result is presumed to be valid and False otherwise.

Processing:

1. /* Compute parameters for $E_n$ if they are not already defined. */

/* Typically done only once for a given set of curves $E_p$ and $E_q$. */

1.1 if $E_n$ is not defined then 1.1.1 n=pq 1.1.2 $a_n$=garner($a_p$, $a_q$, p, q) /* $a_p \equiv a_n \bmod p$, $a_q \equiv a_n \bmod q$ */

1.1.3 $b_n$=garner($b_p$, $b_q$, p, q) /* $b_p \equiv b_n \bmod p$, $b_q \equiv b_n \bmod q$ */

2. /* Compute $P_n$ from $P_p$ and $P_q$. */
  2.1 $x_{Pn}$=garner($x_{Pp}$, $x_{Pq}$, p, q) /* $x_{Pp} \equiv x_{Pn}$ mod p, $x_{Pq} \equiv x_{Pn}$ mod q */
  2.2 $y_{Pn}$=garner($y_{Pp}$, $y_{Pq}$, p, q) /* $y_{Pp} \equiv y_{Pn}$ mod p, $y_{Pq} \equiv y_{Pn}$ mod q */
3. /* Recode k as k=$k_r$+adj and compute $k_{rq}$=$k_r$ mod $n_q$. */
  /* Recoding avoids partial results iP where i=$n_q$ or $n_p$ and it can also avoid additions that would project to point doubles in $E_q$ or $E_q$ but not in both for applications requiring different operations for point addition and point double. */
  /* Note that $k_rP_q$=($k_r$ mod $n_q$)$P_q$=$k_{rq}P_q$. */
  3.1 $k_r$, adj, $k_{rq}$=recode(k, $n_p$, $n_q$)
4. /* Compute $Q_n$=$k_rP_n$=(k−adj)$P_n$=($x_{Qn}$,$y_{Qn}$). */
  4.1 $Q_n$=point_multiplication($k_r$, $P_n$, $E_n$)
5. /* Compute $Q_q$=$k_rP_q$=($k_r$ mod $n_q$)$P_q$=($x_{Qq}$,$y_{Qq}$). */
  5.1 $Q_q$=point_multiplication($k_{rq}$, $P_q$, $E_q$)
6. /* Derive $Q'_p$ and $Q'_q$ from $Q_n$. */
  6.1 $Q'_p$=($x_{Q'p} \equiv x_{Qn}$ mod p, $y_{Q'p} \equiv y_{Qn}$ mod p)
  6.2 $Q'_q$=($x_{Q'q} \equiv x_{Qn}$ mod q, $y_{Q'q} \equiv y_{Qn}$ mod q)
7. /* Compare results $Q_q$ and $Q'_q$ and set error status. */
  7.1 if ($x_{Qq} \equiv x_{Q'q}$ mod q) and ($y_{Qq} \equiv y_{Q'q}$ mod q) then result_is_valid=True
  7.2 else result_is_valid=False
8. /* Adjust $Q'_p$. */
  8.1 $Q_p$=point_addition($Q'_p$, adj, $P_p$, $E_p$) /* $Q_p$=$Q'_p$+adj*$P_p$=$kP_p$ */
9. /* Check that resulting point is on the curve and set error status. */
  9.1 if $y_{Qp}^2$ mod p/$\equiv x_{Qp}^3$+$a_px_{Qp}$+$b_p$ mod p then result_is_valid=False */
10. /* Return result. */
  10.1 return ($Q_p$, $E_n$, result_is_valid)

Figures 7A, 7B:
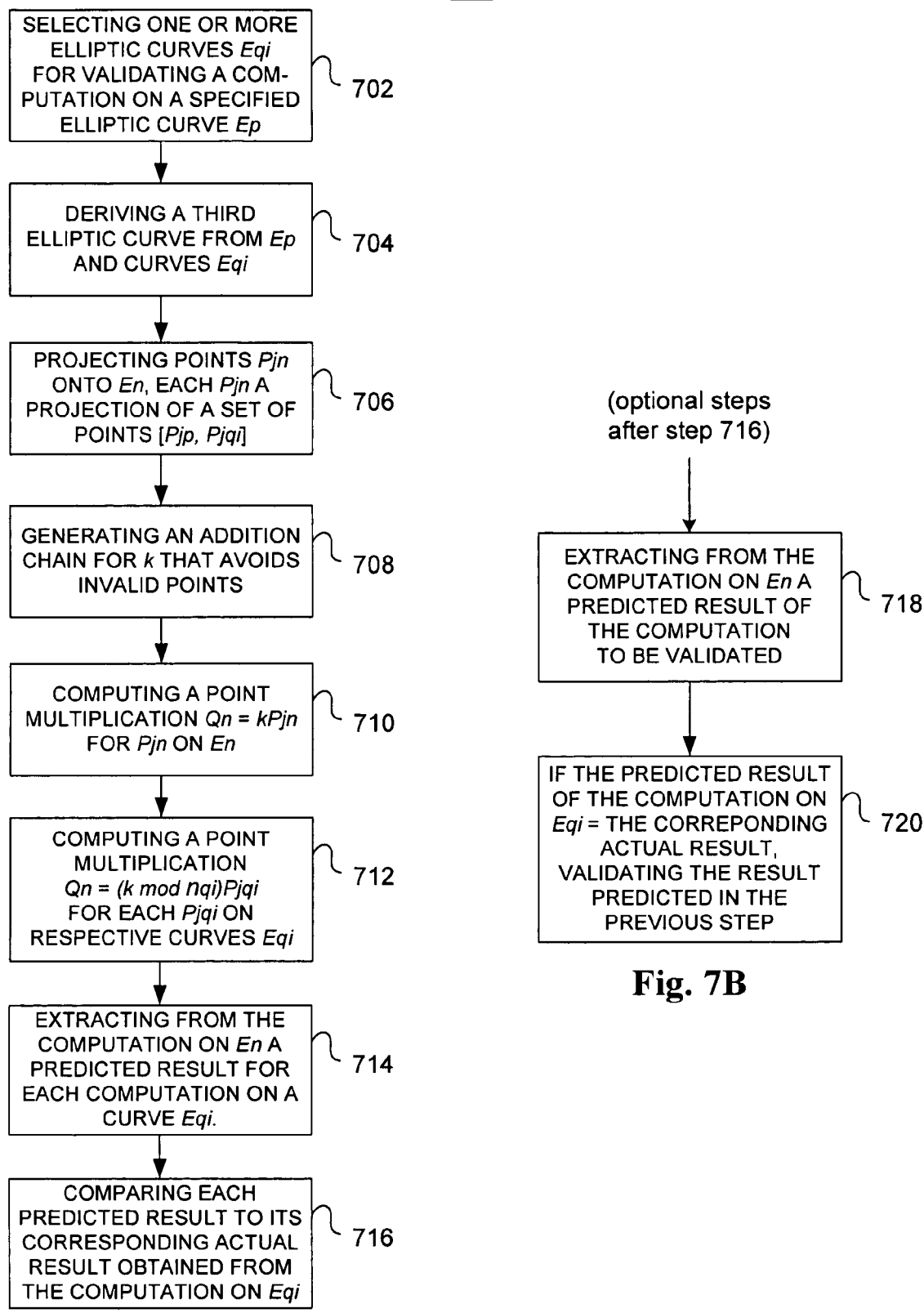
FIG. 7A illustrates one embodiment of a reliable point multiplication method according to the invention.
FIG. 7B illustrates optional process steps for the method of FIG. 7A.

FIG. 7 illustrates another embodiment of a method 700 according to the invention for validating a point multiplication $kP_p$ on a specified elliptic curve $E_p$ defined over a prime field, where k is an integer and $P_p$ is a point in $E_p$. Method 700 begins with step 702, which comprises selecting one or more elliptic validation curves $E_{qi}$, where i=1 to m (m an integer). The next step 704 comprises deriving an elliptic curve $E_n$ from the specified curve $E_p$ and the one or more validation curves $E_{qi}$. This derivation may be performed, for example, according to a cryptographic algorithm such as Garner's Algorithm. In the next step 706, one or more points $Pj_n$ are projected onto $E_n$, each point $Pj_n$ a projection of a set of points $[Pj_p, Pj_{qi}]$=$[Pj_p, Pj_{q1}, Pj_{q2}, \ldots Pj_{qm}]$, where $Pj_p \in E_p$, $Pj_{qi} \in E_{qi}$, and j=1 to m (m an integer).

The next step 708 comprises generating an addition chain for k that avoids invalid points. Examples of invalid points include a point double in $E_q$ that does not map to a point double in $E_p$. In step 710, a point multiplication $Q_n$=$kPj_n$ is computed for $Pj_n$ on curve $E_n$. In step 712, point multiplications $Q_{qi}$=(k mod $n_{qi}$)$Pj_{qi}$ are computed for each $Pj_{qi}$ of order $n_{qi}$ on each curve $E_{qi}$, respectively. Then, step 714 is performed to extract, from the computation on $E_n$, a predicted result for each computation on a curve $E_{qi}$. Finally in step 716 each predicted result is compared to its corresponding actual result obtained from the computation on $E_{qi}$.

The following additional steps may be performed in a method 700 according to the invention. After step 716, step 718 may comprise extracting, from the computation on $E_n$, a predicted result of the computation to be validated. In one implementation, the computation to be validated is a point multiplication of the form $Q_p$=$kP_p$. In step 720, a determination is made whether the predicted result for each computation on $E_{qi}$ equals the corresponding actual result, and if so, validating the result predicted in step 718.

k Recoding

The RPM method relies on the recoding of k in a manner that the partial sums of segments of the addition chain do not result in numbers that are multiples of $n_p$ or $n_q$. If, for example, an addition chain yields an intermediate value $k_{inv}$=c*$n_q$, the partial result of the point multiplication corresponds to $k_{inv}P_n$=$k_{inv}[P_p,P_q]$=$[k_{inv}P_p, O_q]$, which is an invalid point. This embodiment of RPM also requires that additions on $E_n$ when projected to the curves $E_p$ and $E_n$ also correspond to additions or doubles but not a mix of the two.

To minimize the probability of performing an invalid operation, $n_p$ and $n_q$ can be chosen to be very large. However, for computational speed, a curve $E_q$ should be chosen as small as possible within limits that meet expected reliability criteria. Thus, a tradeoff exists between speed and reliability. As processing complexity is simplified, the probability of performing invalid operations rises, thus forcing the use of mechanisms that avoid these operations or compensate for them. For reliable computation, one design alternative is to choose a curve $E_q$ large enough so that the probability of performing an invalid operation is small. This system would use a simpler operation in step 3 and would also avoid step 8 of Algorithm 3. The drawback of such systems is that it could lead to high computational complexity.

Another design alternative is to choose a curve $E_q$ small enough to meet the desired error probability and to use an addition chain that avoids invalid operations. The following section describes an unsigned left-to-right windowing algorithm that meets these criteria. Those skilled in the art will appreciate that this and other recoding concepts disclosed herein can be applied to other point multiplication algorithms, such as fixed and non-fixed-point multiplication algorithms, simultaneous point multiplication algorithms, etc.

Unsigned Windowing Point Multiplication Algorithm with Adjustment

In another embodiment of a reliable ECC computation method according to the invention, a two-step recoding algorithm is employed to avoid invalid point additions. One implementation of a two-step recoding algorithm is shown below in the combination of Algorithm 4 and Algorithm 5. The first step in the two-step recoding algorithm is Algorithm 4, which comprises a classical unsigned, left-to-right, fixed-window recoding algorithm. The second step in the two-step recoding algorithm is Algorithm 5. Algorithm 5 is an adjustment algorithm that adjusts the results of Algorithm 4 that would lead to invalid point additions.

The inputs to Algorithm 4 are a number k and the window size w, and the output is a radix $2^w$ number expressed by a non-redundant digit set with digit values in the range [0, $2^w$). The recoded representation includes on average $(2^w-1)t/2^w$ nonzero digits, where t represents the total number of digits required to represent k.

The inputs to Algorithm 5 are the recoded output of Algorithm 4, the window size w, and a number $n_q$, which value is to be excluded from the prime factorization of partial sums of the addition chain. The result of this algorithm is a number represented, uniquely, using three parameters k', k", and adj, which sum is equal to k.

Algorithm 4: Classical Unsigned, Left-To-Right, Fixed-Window Recoding Algorithm (unsigned_left_right_recode)

Inputs:

$$k = \sum_{i=0}^{m-1} k_i 2^i \text{ /* } k < n_p, k_i \in [0, 1]^* \text{ /}$$

$w$ /* Window size.* /

Outputs:

$$kr = \sum_{i=0}^{t-1} kr_i 2^{wi} \text{ /* } kr_i \in [0, 2^w), t = \lceil m/w \rceil^* \text{ /}$$

Processing:

1. /* Determine the number of digits required to represent $k$.* /

1.1 $t = \lceil m/w \rceil$

2. /* Recode $k$.* /

2.1 $kr_{t-1} = \sum_{j=0}^{(m-1)-(t-1)w} kr_{(t-1)*w+j} 2^j$ /* Most significant digit.* /

2.2 for $i = t-2$ down to 0 do /* Least significant digits.* /

$$kr_i = \sum_{j=0}^{w-1} kr_{i*w+j} 2^j$$

3. return $(kr)$

Algorithm 5: Recoding Adjustment Algorithm for Unsigned Fixed-Window Recoding (unsigned_left_right_recode_adj)

Inputs:

$$k = \sum_{i=0}^{t-1} k_i 2^{wi} \text{ /* } k_i \in [0, 2^w), k \in [1, n_p), n_p \text{rep. order of } P_p^* \text{ /}$$

$w$ /* Window size.* /

$n_q$ /* Multiple to avoid. $n_q > 2^{w+1} - 1$ is prime.* /

Outputs:

/* $k = k' + k'' + adj$* /

/* g.c.d. $\left( \sum_{i=j}^{t-1} (k'_i + k''_i) 2^{w(i-j)}, n_q \right) = 1$ for $j = t-1 \ldots 0$* /

$$k' = \sum_{i=0}^{t-1} k'_i 2^{wi} \text{ /* } k'_i \in [0, 2^w]^* \text{ /}$$

$$k'' = \sum_{i=0}^{t-1} k''_i 2^{wi} \text{ /* } k''_i \in [0, 2^w]^* \text{ /}$$

$adj$ /* $adj \in [0, 1]^*$ /

Processing:

1. /* Initialize variables* /

1.1 $adj = 0$ 1.2 $k_{rq} = 0$

2. /* Recode* /

2.1 for $i = t-1$ down to 0

-continued

/* Absorb adjustment* /

2.1.1 if $adj \neq 0$ then 2.1.1.1 $k'_i = 2^w$ 2.1.1.2 $k''_i = k_i$ 2.1.2 else /* $adj = 0$* /

2.1.2.1 $k'_i = k_i$ 2.1.2.2 $k''_i = 0$ 2.1.3 $adj = 0$

/* Update $k_{rq}$.* /

2.1.4 $k_{rq} = k_{rq} 2^w \bmod n_q$

/* Adjust if sum leads to multiple of $n_q$ or double in $E_q$.* /

2.1.5 if $(k_{rq} + k'_i \equiv 0 \bmod n_q)$ or $(k_{rq} - k'_i \equiv 0 \bmod n_q)$ then 2.1.5.1 $k'_i = k'_i - 1$ 2.1.5.2 $k''_i = k''_i + 1$ /* Update $k_{rq}$.* /

2.1.6 $k_{rq} = k_{rq} + k'_i \bmod n_q$

/* Adjust if sum leads to multiple of $n_q$ or double in $E_q$.* /

2.1.7 if $(k_{rq} + k''_i \equiv 0 \bmod n_q)$ or $(k_{rq} - k''_i \equiv 0 \bmod n_q)$ then 2.1.7.1 $k''_i = k''_i - 1$ 2.1.7.2 $adj = 1$ /* Update $k_{rq}$.* /

2.1.8 $k_{rq} = k_{rq} + k''_i \bmod n_q$

3. /* Return result* /

3.1 return $(k', k'', adj)$

Description of Adjustment Algorithm

The table in FIGS. 8A-8B shows the cases of interest in the loop of Algorithm 5. The steps in the top row of the table correspond to the steps in Algorithm 5.

When Algorithm 4 generates an addition chain that does not lead to invalid point additions, Algorithm 5 outputs k'=k, k''=0, and adj=0. For this scenario, all the loop iterations correspond to case 0 in the table.

Case 1 corresponds to finding a partial sum that is a multiple of $n_q$. Cases 2 and 3 correspond to finding addition chains that would lead to undesirable point doubles in $E_q$. Case 2 propagates the condition while case 3 is able to resolve it without propagating adjustments.

Cases 4 and 5 correspond to adjustment propagations from the previous iterations of the loop that result in partial addition chains whose sums are multiples of $n_q$. Case 4 is unable to resolve adjustment propagation because $k_i$ is zero. Case 5 resolves adjustment propagation.

Cases 6 to 10 correspond to adjustment propagations from the previous iterations that would lead to undesirable point doubles in $E_q$. Cases 6 and 8 resolve previous adjustments. Cases 7 and 9 resolve previous adjustments but they encountered multiples of $n_q$, which resolution they propagate. Case 10 resolves a previous adjustment but encounters another condition that would lead to an undesirable point double in $E_q$.

The cases listed in the table assume that $n_q > 2^{w+1} - 1$. This $n_q$ selection avoids encountering an undesirable condition after an adjustment; for example, when subtracting one from $k'_i$ in case 1, the resulting $k'_i - 1$ is not equal to $k_{r_q}$, which would lead to an undesirable double operation in $E_q$. Cases 7, 9, and 10 can be avoided with proper $n_q$ selection.

Example of Recoding Algorithm

The table in FIG. 9 shows a recoding example according to the invention. This example shows recoding of an addition chain adjusted according to Algorithm 5 with $k=30$, $n_q=5$, and $w=1$. When used in a point multiplication process, the addition chain avoids invalid point doubles and points that will project the points at infinity in $E_q$. This example shows the recoding of $k=(k_4 k_3 k_2 k_1 k_0)_2$ as the sum of $k=k'+k''+adj$, where $k'=(k'_4 k'_3 k'_2 k'_1 k'_0)_2$, $k''=(k''_4 k''_3 k''_2 k''_1 k''_0)_2$, and adj is a scalar (adj refers to the value of adj at the end of the algorithm).

Point Multiplication Algorithm with Adjustment

In another aspect of the invention, RPM may be computed after a recoding adjustment. Algorithm 6 shows the recoding algorithm correspondent to step 3.1 of Algorithm 3. Algorithm 7 shows the point multiplication function correspondent to step 4.1 of Algorithm 3. The point multiplication in step 5.1 of Algorithm 3 need not be computed using Algorithm 7. This point multiplication can be computed using classical point multiplication algorithms, including fixed-point algorithms.

Algorithm 6: Fixed-Window Recoding Algorithm with Adjustment

Inputs:

$k = \sum_{i=0}^{m-1} k_i 2^i$ /* $k_i \in [0, 1]$* /

$w$ /* Window size.* /

$n_q$ /* Multiple to avoid. $n_q$ is prime* /

$n_p$ /* Multiple to avoid. $n_p$ is prime* /

Outputs:

/* $k = k' + k'' + adj$* /

/* $g.c.d.\left(\sum_{i=j}^{t-1} (k'_i + k''_i) 2^{w(i-j)}, n_q\right) = 1$ for $j = t-1 \ldots 0$* /

$k' = \sum_{i=0}^{t-1} k'_i 2^{wi}$ /* $k'_i \in [0, 2^w]$* /

$k'' = \sum_{i=0}^{t-1} k''_i 2^{wi}$ /* $k''_i \in [0, 2^w]$* /

$adj$ /* $adj \in [0, 1]$* /

Processing:

1. /* Limit values of $k$ to range $[0, n_p)$(typically $k < n_p$).* /

1.1 $k = k \mod n_p$

2. /* Perform classical recoding of $k$(Algorithm 4).* /

2.1 $kr$ = unsigned_left_right_recode($k$, $w$)

3. /* Adjust recoding (Algorithm 5).* /

3.1 $k'$, $k''$, $adj$ = unsigned_left_right_recode_adj($kr$, $w$, $n_q$)

-continued

4. /* Return result.* /

4.1 return($k'$, $k''$, $adj$)

Algorithm 7: Fixed-Window Point Multiplication Algorithm with Adjustment

Inputs:

/* $k' + k'' = k - adj$ =* /

$k' = \sum_{i=0}^{t-1} k'_i 2^{wi}$ /* $k'_i \in [0, 2^w]$* /

$k'' = \sum_{i=0}^{t-1} k''_i 2^{wi}$ /* $k''_i \in [0, 2^w]$* /

$P \in E_n$ /* Point on elliptic curve defined over ring.* /

Outputs:

$Q = -(k' + k'')P$ /* Point multiplication result.* /

Processing:

1. /* Initialize values.* /

1.1 $Q = O$ 1.2 $P_1 = P$

2. /* Pre-compute points.* /

2.1. for $i = 2$ to $2^w$ do 2.1.1. $P_i = P_{i-1} + P_1$

3. /* Compute the point multiplication */

3.1 for $i = t - 1$ down to 0 do 3.1.1 $Q =$ $2^w Q$ /* Computed by doubling Qw times: $(2(2(2( \ldots 2(Q) \ldots ))))$* /

3.1.2 if $k'_i \neq 0$ then 3.1.2.1 $Q = Q + P_{k'_i}$ 3.1.3 if $k''_i \neq 0$ then 3.1.3.1 $Q = Q + P_{k''_i}$ 4. /* Return result* /

4.1 return ($Q$)

Performance of Rpm Algorithm when Using Fixed-Window Recoding

The following sections develop expressions for estimating the need for Algorithm 5 adjustments and also provide general complexity approximations for the RPM algorithm. The general complexity estimates assumes a low need of adjustment, which result from the use of relatively large values of $n_q$ (e.g., 16 bit prime).

Probability of Encountering an Addition Chain that does not Require Adjustments

Algorithm 5 adjusts the results of Algorithm 4 so that invalid operations in $E_n$ are avoided. The conditions to avoid correspond to multiples of $n_q$ that lead to $O_q$ when results in $E_n$ are projected into $E_q$ and to additions of two values that modulo $n_q$ correspond to the same value, a condition that projects to a point double in $E_q$ and a point addition in $E_p$.

In another aspect of the invention, to establish the need for addition chain adjustment, additional method steps may be required that estimate the probability of obtaining an addition chain from Algorithm 4 that avoids undesirable conditions.

These methods include an expression for estimating the probability of avoiding multiples of $n_q$, and also expressions for estimating the probability of avoiding undesirable point doubles when the operations are projected into $E_q$. An additional method includes an expression that covers both cases. For simplicity, the probabilities are described using as an example the classical double and add algorithm (w=1). Generalized expressions for the fixed-window algorithm are also provided. FIGS. 10 and 11 show tabulated results of complexity estimates' error probabilities gathered from running simulations for random values of k.

Consider the case of the double and add point multiplication algorithm, which scans the bits of the multiplier $k=(k_{m_k-1}, \ldots, k_1, k_0)_2$ from its most significant bit (MSB) to its least significant bit (LSB). Let $m_k = \lceil \log_2 k \rceil$, $m_{nq} = \lfloor \log_2 n_q \rfloor$, $k_{m_k-1} > 0$, and let $n_q$ be an odd prime greater that three.

The scanning of the first $m_{nq}$ bits $(k_{m_k-1}, \ldots, k_{m_k-m_{nq}})_2$ does not yield a multiple of $n_q$ because $(k_{m_k-1}, \ldots, k_{m_k-m_{nq}})_2 < 2^{m_{nq}} < n_q$. If bit $k_{m_k-m_{nq}-1}$ is zero, the partial result $(k_{m_k-1}, \ldots, k_{m_k-m_{nq}})_2$ is multiplied by two, which is not a factor of $n_q$, and therefore, the result $(k_{m_k-1}, \ldots, k_{m_k-m_{nq}}, k_{m_k-m_{nq}-1}=0)_2$ is not a multiple of $n_q$. On the other hand, if $k_{m_k-m_{nq}-1}$ is one, about $1/n_q$ of the possible values $(k_{m_k-1}, \ldots, k_{m_k-m_{nq}}, k_{m_k-m_{nq}-1}=1)_2$ are multiples of $n_q$.

For the last approximation let $k_{tmp} = (k_{m_k-1}, \ldots, k_{m_k-m_{nq}})_2 \in [1, n_q)$. The double operation $2k_{tmp} \mod n_q \in [1, n_q)$ permutes the values of $k_{tmp}$. The addition that follows permutes the values again, and pushes the values $k_{tmp} \equiv (n_q-1)/2 \mod n_q$ to be congruent to $n_q$ ($k_{tmp} = 2k_{tmp} + k_{m_k-m_{nq}-1} \equiv 0 \mod n_q$). Assuming that all the values are equally distributed, approximately $1/n_q$ of the values become a nonzero multiple of $n_q$.

Given that $$k_{tmp} = \sum_{i=m_k-m_{nq}}^{m_k-1} k_i 2^{i-(m_k-m_{nq})}$$

is not a multiple of $n_q$, multiples of $n_q$ are encountered only when the bits $k_i$ for $i \in [0, m_k-m_{nq})$ are not zero. When a nonzero bit $k_i$ is encountered, the probability that the partial result is a multiple of $n_q$ is approximately $1/n_q$. The probability that $k_i$ is nonzero is ½ for a random k. Therefore, using the expression shown in Equation (9), the probability that a multiple of $n_q$ is not encountered in the partial sums of an addition chain can be approximated. In this equation, $Pr(k_i \neq 0)$ represents the probability that a bit of k is one.

The probabilities of encountering invalid double operations can also be approximated using the same approach used above for multiples of $n_q$. As in the case of multiples of $n_q$, possible invalid doubles could start occurring when processing $k_{m_k-m_{nq}-1}$, and possible doubles could result only when processing nonzero bits $k_i$ for $i \in [0, m_k-m_{nq})$. The partial value of $(k_{m_k-1}, \ldots, k_{m_k-m_{nq}})_2$ is lower than $n_q$ but it is larger than any value that $k_{m_k-m_{nq}-1}$ can take; therefore, the addition chain cannot lead to invalid doubles before processing $k_{m_k-m_{nq}-1}$. If $k_{m_k-m_{nq}-1}$ is zero, no addition operations are needed and therefore no invalid double could occur. On the other hand, if $k_{m_k-m_{nq}-1}$ is one and the partial values of $k_{tmp} = (k_{m_k-1}, \ldots, k_{m_k-m_{nq}}, 0)_2$ are equally distributed, the probability that $k_{tmp} \equiv k_{m_k-m_{nq}-1} \mod n_q$ is approximately $1/n_q$. Given that $m_k - m_{nq}$ bits are processed and that the probability of avoiding a point double for each processed nonzero bit is $(1-1/n_q)$, the probability of successfully avoiding invalid point double operations can be also approximated with the expression show in Equation (9).

$$Pr1 = (1-1/n_q)^{(m_k-m_{nq})*Pr(k_i \neq 0)} \qquad (9)$$

Equation (10) shows an expression for the probability of encountering an addition chain that avoids both multiples of $n_q$ and values that would lead to invalid point doubles in projections into $E_q$. Using an analysis similar to the one shown above, it can be shown that for each nonzero bit $k_i$ for $i \in [0, m_k-m_{nq})$ two failure cases can be encountered: one case corresponds to a multiple of $n_q$ and the other case corresponds to a value that would lead to an invalid point double. These conditions are mutually exclusive when $n_q$ is an odd prime, and therefore, the aggregate probability of encountering either of these cases is approximately $2/n_q$. Given that $m_k - m_{nq}$ bits are processed and that the probability of avoiding both undesirable cases for each processed nonzero bit is $(1-2/n_q)$, the probability of encountering an addition chain that avoids both conditions can be approximated with the expression show in Equation (10).

$$Pr2 = (1-2/n_q)^{(m_k-m_{nq})*Pr(k_i \neq 0)} \qquad (10)$$

Equation (11) and Equation (12) show general expressions of Equation (9) and Equation (10) for the fixed-window point multiplication algorithm, of which the classical double and add algorithm is the special case for which w=1. In these equations, $m_k = \lceil \log_{2^w} k \rceil$, $m_{nq} = \lfloor \log_{2^w} n_q \rfloor$, $Pr(k_i \neq 0) = (2^w-1)/2^w$ (note that one of the possible $2^w$ values of $k_i$ is zero), and $k = (k_{m_k-1}, \ldots, k_1, k_0)_{2^w}$.

$$Pr3 = (1-1/n_q)^{(m_k-m_{nq})*Pr(k_i \neq 0)} \qquad (11)$$

$$Pr4 = (1-2/n_q)^{(m_k-m_{nq})*Pr(k_i \neq 0)} \qquad (12)$$

FIG. 10 and FIG. 11 each show tabulated simulation results of a recoding RPM algorithm according to the invention. The table in FIG. 10 summarizes recoding results for all values of k in the range $[1, 2^{16}]$. The table in FIG. 11 shows results of $2^{16}$ random values of k in the range $[1, 2^{192}]$. These tables show measured probabilities, estimated probabilities based on Equation 12, and the estimation error. The tables show that the estimation error is low, especially for large values of $n_q$. The results in the tables show that the probability of obtaining an addition chain from Algorithm 4 that requires no adjustment increases as the value $n_q$ increases and it also increases as the window size (w) increases.

RPM Algorithm Complexity

When $n_q > (2^{w+1} + 1(2^w - 1))$, cases 7, 9, and 10 of FIG. 8A are avoided. When these cases are avoided, an adjustment due to an invalid double operation is absorbed when processing the next digit, for example, as demonstrated in cases 6 and 8. An adjustment due to a found multiple of $n_q$ is propagated if the next digit in the addition chain is zero, as in case 4; otherwise, the next digit absorbs the adjustment, as in case 5.

Equation 13 shows an expression for the expected adjustment propagation length due to multiples of $n_q$. This equation accounts for intervening runs of zero digits terminated by nonzero digits. The worse case propagation occurs when a multiple of $n_q$ is found early in the chain and it is propagated for $m_k - m_{nq}$ digits, a case that is very unlikely for large k.

$$E1 = 2^w/(2^w-1) \qquad (13)$$

When the probability of adjustment is low, the additional overhead due to adjustments can be considered to be negligible. In these cases the complexity of the point multiplication with adjustment can be approximated by the complexity of point multiplication without adjustment. Equation 14 approximates the complexity of the point multiplication operation. In this equation, D represents the complexity of a point double, A represents the complexity of a point addition, and m represents the number of bits of k. Equation 15 provides an approximation for the number of bits required to store the pre-computed values. This expression assumes the storage of two coordinates per point. In comparison with Algorithm 4, Algorithm 5 includes the storage of one extra point.

$$\#OPs = mD + (\lceil m/w \rceil (2^w - 1)/2^w)A \qquad (14)$$

$$\#MBs = m2^{w+1} \qquad (15)$$

The most complex operations of the RPM algorithms are the two point multiplications. Of these, the point multiplication in $E_n$ is the most complex. The point multiplication in $E_n$ is of the order $O((\log_2 n/\log_2 q)^3)$ times more complex than the point multiplication in $E_q$. This expression accounts for the square complexity of multiplications and the linear complexity of point multiplication (k vs. k mod $n_q$).

CONCLUSIONS

This disclosure introduces two methods for the reliable computation of point additions and point multiplications. For point multiplication, one embodiment of an unsigned fixed-window algorithm is disclosed. Those skilled in the art will recognize that the same principles employed in this algorithm can be extended to other point multiplication algorithms. The basic idea is to use a classical point multiplication algorithm and to adjust the addition chains that it generates so that they avoid invalid operations.

The RPA and RPM methods disclosed herein rely on asymmetric operations. For typical cases, the reliability of an ECC operation must be known. Rather than performing the ECC operation twice to ensure reliability (i.e. symmetric or redundant operation), two asymmetric operations are performed: one of the operations is of slightly higher complexity than the ECC operation, and the other operation is much simpler. The complexity of each operation is a function of the expected, or desired, degree of reliability.

The complexity of the simpler operation can be further reduced in comparison with the complex operation, for example, by using fixed-point multiplication algorithms or by using the Montgomery trick that computes only the x coordinate of a point multiplication. In this last case, the y coordinate of the resulting point in $E_p$ can be verified by checking that the resulting x and y coordinates satisfy the elliptic curve equation.

The validity of the algorithms disclosed herein has been verified with simulations, and the results of these simulations have also been disclosed. In short, the methods presented here provide a way to reliably compute ECC operations with much lower complexity than fully redundant methods. And while various embodiments of the invention have been described, it will be apparent to those of ordinary skill in the art that many more embodiments and implementations are possible that are within the scope of this invention. Accordingly, the invention is not to be restricted except in light of the attached claims and their equivalents.

What is claimed is:

1. In a computer system comprising a processor, a method for validating a computation involving one or more points on a specified elliptic curve, $E_p$, comprising:

selecting, via the processor, a second elliptic curve, $E_q$;

deriving, via the processor, a third elliptic curve, $E_n$, from $E_p$ and $E_q$;

projecting, via the processor, one or more points $Pj_n$ onto $E_n$, each point $Pj_n$ a projection of a set of points $[Pj_p, Pj_q]$ where $Pj_p \in E_p$, $Pj_q \in E_q$, and j=1 to t (t an integer);

performing a computation, via the processor, on $E_n$ involving the one or more projected points $Pj_n$;

performing a computation, via the processor, on $E_q$ involving one or more points $Pj_q$;

extracting, from the computation on $E_n$, a predicted result of the computation on $E_q$; and comparing, via the processor, the predicted result to an actual result of the computation on $E_q$.

2. The method of claim 1 further comprising:

extracting, via the processor, from the computation on $E_n$, a predicted result of the computation to be validated; and if the predicted result of the computation on $E_q$ equals the actual result of the computation on $E_q$;

validating, via the processor, the result predicted in the second extracting step.

3. The method of claim 1 wherein at least one of elliptic curves $E_p$ and $E_q$ is defined over a prime field.

4. The method of claim 1 wherein at least one of elliptic curves $E_p$ and $E_q$ is defined over a ring.

5. The method of claim 3 or 4 wherein the elliptic curves are composed by a set of points (x,y) that satisfies an elliptic curve equation together with a point at infinity.

6. The method of claim 5 wherein the equation is $y^2 \equiv x^{3+a}{}_p x + b_p \mod p$, where a and b are constants, and where p is a prime number greater than 3.

7. The method of claim 1 wherein curves $E_p$ and $E_q$ are defined over prime fields $F_p$ and $F_q$, respectively; $E_n$ is defined over a ring $Z_n$; p and q are coprime; and n=pq.

8. The method of claim 1 wherein $E_p$ and $E_q$ are defined by elliptic curve equations of similar form, and $E_n$ is derived from $E_p$ and $E_q$ by means of Chinese Remainder Theorem.

9. The method of claim 1 wherein the one or more resultant points $Pj_n$ are derived by means of Chinese Remainder Theorem.

10. The method of claim 1 wherein the computation to be verified comprises a point addition.

11. The method of claim 10 wherein the point addition comprises $Q_p = P_{1p} + P_{2p}$, where $P_{1p}$, $P_{2p}$ are elements of $E_p$.

12. The method of claim 11 wherein the computation on $E_q$ comprises a point addition $Q_q = P_{1q} + P_{2q}$, where $P_{1q}$, $P_{2q}$ are elements of $E_q$.

13. The method of claim 12 wherein the computation on $E_n$ comprises a point addition $Q_n = P_{1n} + P_{2n}$, where $P_{1n} = [P_{1p}, P_{1q}]$, $P_{2n} = [P_{2p}, P_{2q}]$ are elements of $E_n$.

14. The method of claim 1 wherein $Q'_q$, the predicted result of the computation on $E_q$, is extracted according to the equation $Q'_q = (x_{Q'q} \equiv x_{Qn} \mod q, y_{Q'q} \equiv y_{Qn} \mod q)$, wherein curves $E_p$, $E_q$, $E_n$ use arithmetic modulo p, q and n, respectively, where p and q are coprime numbers greater than 3, and where n=pq.

15. The method of claim 2 wherein $Q'_p$, the predicted result of the computation to be validated, is extracted according to the equation $Q'p = (x_{Q'p} \equiv x_{Qn} \mod p, y_{Q'p} \equiv y_{Qn} \mod p)$, wherein curves $E_p, E_q, E_n$ use arithmetic modulo p, q and n, respectively, where p and q are coprime numbers greater than 3, and where n=pq.

16. A processor readable medium tangibly embodying the method of claim 1 as a series of software instructions.

17. The medium of claim 15 selected from the group comprising RAM, ROM, PROM, EPROM, EEPROM, disk, floppy disk, hard disk, CD-ROM, DVD and flash memory.

18. A logic device configured to execute the methods of claim 1.

19. The device of claim 18 selected from the group comprising embedded computer, integrated circuit, customized gate array, FPGA, and ASIC.

20. The method of claim 1 wherein the computation to be validated comprises point subtractions.

* * * * *

UNITED STATES PATENT AND TRADEMARK OFFICE
CERTIFICATE OF CORRECTION

PATENT NO.        : 7,742,596 B2                                           Page 1 of 1
APPLICATION NO.   : 11/158635
DATED             : June 22, 2010
INVENTOR(S)       : Gerardo Orlando It is certified that error appears in the above-identified patent and that said Letters Patent is hereby corrected as shown below:

Column 24, line 35, "$y^2 \equiv x^{3+a}{}_p x + b_p$" should be changed to -- $y \equiv x^3 + a_p x + b_p$ --.

Signed and Sealed this

Fourteenth Day of September, 2010

David J. Kappos
*Director of the United States Patent and Trademark Office*